(12) United States Patent
Champagne et al.

(10) Patent No.: US 10,897,953 B2
(45) Date of Patent: Jan. 26, 2021

(54) SKATE

(71) Applicant: BAUER HOCKEY, LLC, Exeter, NH (US)

(72) Inventors: Gaetan Champagne, Saint-Colomban (CA); David Daub, Kitchener (CA); Kent Chang, Taichung (TW)

(73) Assignee: BAUER HOCKEY, LLC, Exeter, NH (US)

( * ) Notice: Subject to any disclaimer, the term of this patent is extended or adjusted under 35 U.S.C. 154(b) by 0 days.

(21) Appl. No.: 16/291,117

(22) Filed: Mar. 4, 2019

(65) Prior Publication Data

US 2019/0191817 A1 Jun. 27, 2019

Related U.S. Application Data

(63) Continuation of application No. 15/339,028, filed on Oct. 31, 2016, now Pat. No. 10,226,096.

(51) Int. Cl.
| | |
|---|---|
| A63C 1/40 | (2006.01) |
| A43B 5/16 | (2006.01) |
| A43C 5/00 | (2006.01) |
| A43B 3/00 | (2006.01) |
| A63C 1/30 | (2006.01) |
| A63C 1/02 | (2006.01) |
| A43B 23/26 | (2006.01) |
| B29D 35/12 | (2010.01) |
| A63C 3/02 | (2006.01) |
| A63C 1/42 | (2006.01) |

(52) U.S. Cl.
CPC .......... *A43B 5/1691* (2013.01); *A43B 3/0078* (2013.01); *A43B 5/1616* (2013.01); *A43B 5/1666* (2013.01); *A43B 23/26* (2013.01); *A43C 5/00* (2013.01); *A63C 1/02* (2013.01); *A63C 1/303* (2013.01); *A63C 1/40* (2013.01); *A63C 1/42* (2013.01); *A63C 3/02* (2013.01); *B29D 35/126* (2013.01)

(58) Field of Classification Search
CPC .... A63C 1/42; A63C 1/40; A63C 1/02; A63C 17/02; A43B 5/1616; A43B 5/1625; A43B 5/1666; A43B 5/1683; A43B 5/1691
USPC ......... 280/11.12, 11.221, 11.27; 36/115, 133
See application file for complete search history.

(56) References Cited

U.S. PATENT DOCUMENTS

| | | | |
|---|---|---|---|
| 3,807,062 A | * 4/1974 | Spier | A43B 1/0018 36/117.1 |
| 4,509,276 A | * 4/1985 | Bourque | A43B 5/1683 12/142 R |

(Continued)

OTHER PUBLICATIONS

Office Action issued by the USPTO in connection with U.S. Appl. No. 15/339,028 dated Oct. 4, 2017, 6 pages.

(Continued)

*Primary Examiner* — Jeffrey J Restifo

(57) ABSTRACT

A skate (e.g., an ice skate) for a user (e.g., a hockey player). The skate comprises a skate boot for receiving a foot of the user and a skating device (e.g., a blade and a blade holder) disposed beneath the skate boot to engage a skating surface. The skate boot may be constructed by molding (e.g., injection molding) so as to have useful performance and/or characteristics (e.g., reduced weight; enhanced fit, comfort and range of motion; enhanced appearance; etc.) while being cost-effectively manufactured.

23 Claims, 24 Drawing Sheets

(56) References Cited

U.S. PATENT DOCUMENTS

| | | | | |
|---|---|---|---|---|
| 5,326,115 A * | 7/1994 | Seltzer | A43B 5/1658 | 280/11.19 |
| 5,339,545 A * | 8/1994 | Paris | A43B 5/0405 | 36/117.6 |
| 5,454,172 A * | 10/1995 | Crigger | A43C 13/08 | 36/71.5 |
| 5,462,295 A * | 10/1995 | Seltzer | A43B 5/1658 | 280/11.19 |
| 5,582,417 A * | 12/1996 | Schaper | A43B 5/16 | 280/11.231 |
| 5,924,706 A * | 7/1999 | Seltzer | A43B 5/1691 | 280/11.3 |
| D414,916 S * | 10/1999 | Rench | D2/904 | |
| 6,295,679 B1 * | 10/2001 | Chenevert | A43B 3/26 | 12/142 P |
| 6,416,064 B1 * | 7/2002 | Evans | A63C 17/0046 | 280/11.221 |
| 6,523,835 B1 * | 2/2003 | Lyden | A63C 1/30 | 280/11.12 |
| 6,612,592 B1 * | 9/2003 | Soo | A43B 3/26 | 280/11.16 |
| 7,047,668 B2 * | 5/2006 | Burris | A43B 5/02 | 36/133 |
| 7,140,127 B2 * | 11/2006 | Yang | A43B 5/1625 | 36/45 |
| 7,155,846 B2 * | 1/2007 | Alfaro | A43B 1/0027 | 36/136 |
| 7,316,083 B2 * | 1/2008 | Labonte | A43B 5/1666 | 264/154 |
| 7,325,813 B2 * | 2/2008 | Bock | A43B 5/1625 | 280/11.12 |
| 7,398,609 B2 * | 7/2008 | Labonte | A43B 5/1691 | 36/115 |
| 7,533,479 B2 * | 5/2009 | LaBonte | A43B 5/1683 | 36/114 |
| 7,793,947 B2 * | 9/2010 | Labonte | A43B 5/1666 | 280/11.12 |
| 7,866,675 B2 * | 1/2011 | Hauser | A63C 1/303 | 280/11.12 |
| 7,896,363 B2 * | 3/2011 | Lovejoy | A43B 5/1641 | 280/11.12 |
| 7,913,420 B2 * | 3/2011 | Arizumi | A43B 7/08 | 36/3 A |
| 7,950,676 B2 * | 5/2011 | Goldsmith | A43B 5/1625 | 280/11.12 |
| 8,387,286 B2 * | 3/2013 | Koyess | A43B 5/1616 | 36/115 |
| 8,555,527 B2 * | 10/2013 | Koyess | A43B 1/0027 | 36/45 |
| 8,684,368 B2 * | 4/2014 | Van Horne | A43B 5/1691 | 280/11.12 |
| 8,726,540 B2 * | 5/2014 | Crowley, II | A43B 1/0009 | 36/8.1 |
| 8,778,251 B2 * | 7/2014 | Yang | B29D 35/126 | 12/142 P |
| 8,844,171 B2 * | 9/2014 | Eder | A43B 1/0009 | 36/133 |
| 9,282,787 B2 * | 3/2016 | Ferniani | A43B 7/08 | |
| 9,320,315 B2 * | 4/2016 | Van Horne | A43B 5/1683 | |
| 9,392,840 B2 * | 7/2016 | Champagne | A43B 5/1666 | |
| 9,554,615 B2 * | 1/2017 | Labonte | A43B 5/16 | |
| 9,585,434 B2 * | 3/2017 | Van Atta | A43B 5/025 | |
| 9,622,539 B2 * | 4/2017 | Labonte | A43B 5/1666 | |
| 9,648,922 B2 * | 5/2017 | Koyess | A43B 5/1683 | |
| 9,693,600 B1 * | 7/2017 | Van Horne | A43B 5/1683 | |
| 10,226,096 B2 * | 3/2019 | Champagne | A43B 5/1691 | |

OTHER PUBLICATIONS

Non-Final Office action issued by the USPTO in connection with U.S. Appl. No. 15/339,028 dated Jan. 10, 2018, 12 pages.

Final Office Action dated Aug. 27, 2018 by the USPTO in connection with U.S. Appl. No. 15/339,028, 5 pages.

Notice of Allowance dated Nov. 19, 2018 by the USPTO in connection with U.S. Appl. No. 15/339,028, 5 pages.

VH Footwear Introduces One Piece Goal Skate, Apr. 27, 2016—print screen Feb. 10, 2017.

* cited by examiner

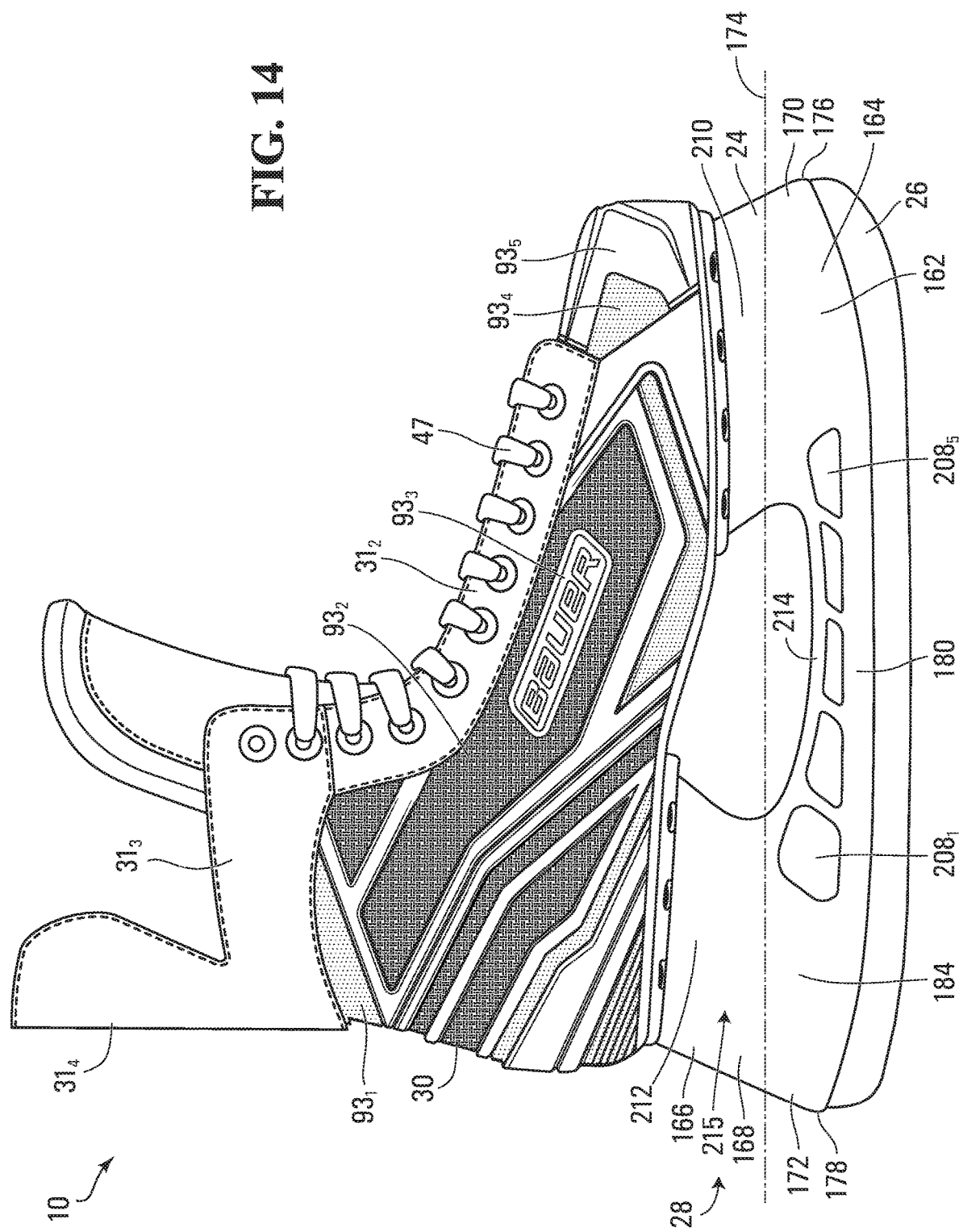

SKATE

CROSS-REFERENCE TO RELATED APPLICATION

This application is a continuation of U.S. patent application Ser. No. 15/339,028, filed on Oct. 31, 2016. The contents of the aforementioned application are incorporated by reference herein.

FIELD

The invention generally relates to skates (e.g., ice skates), such as for playing hockey and/or for other activities.

BACKGROUND

Skates are used by users in various sports such as ice hockey, roller hockey, etc. and other skating activities.

A skate comprises a skate boot that typically comprises a number of components that are assembled together to form the skate boot. This can include a shell, a toe cap, a tongue, a tendon guard, etc. In some cases, this may entail numerous operations to make the skate boot, which may be impractical, inefficient and/or costly.

For these and/or other reasons, there is a need for improvements directed to skates.

SUMMARY

In accordance with various aspects of the invention, there is provided a skate (e.g., an ice skate) for a user. The skate comprises a skate boot for receiving a foot of the user and a skating device (e.g., a blade and a blade holder) disposed beneath the skate boot to engage a skating surface. The skate boot may be constructed by molding (e.g., injection molding) so as to have useful performance and/or other characteristics (e.g., reduced weight; enhanced fit, comfort and range of motion; enhanced appearance; etc.) while being cost-effectively manufactured.

For example, in accordance with an aspect of the invention, there is provided a skate. The skate comprises a skate boot defining a cavity to receive a foot of a user. The skate boot comprises a monolithic body comprising an ankle portion to receive an ankle of the user, a heel portion to receive a heel of the user's foot, a medial side portion to face a medial side of the user's foot, a lateral side portion to face a lateral side of the user's foot, a sole portion to face a plantar surface of the user's foot, and a toe portion to enclose toes of the user's foot. The monolithic body is injection molded such that the ankle portion, the heel portion, the medial side portion, the lateral side portion, the sole portion, and the toe portion are injection molded together and integral with one another. The skate boot also comprises lacing holes to receive a lace and extending through the monolithic body. The skate also comprises a skating device disposed beneath the skate boot to engage a skating surface.

In accordance with another aspect of the invention, there is provided a skate. The skate comprises a skate boot defining a cavity to receive a foot of a user. The skate boot comprises a monolithic body comprising an ankle portion to receive an ankle of the user, a heel portion to receive a heel of the user's foot, a medial side portion to face a medial side of the user's foot, a lateral side portion to face a lateral side of the user's foot, a sole portion to face a plantar surface of the user's foot, and a toe portion to enclose toes of the user's foot. The monolithic body is injection molded such that the ankle portion, the heel portion, the medial side portion, the lateral side portion, the sole portion, and the toe portion are injection molded together and integral with one another. An upper part of the monolithic body is stiffer than a lower part of the monolithic body to facilitate forward flex of the user's ankle and facilitate tightening of the medial side portion and lateral side portion about an instep of the user's foot. The skate boot also comprises lacing holes to receive a lace and extending through the monolithic body. The skate also comprises a skating device disposed beneath the skate boot to engage a skating surface.

In accordance with another aspect of the invention, there is provided an ice skate. The ice skate comprises a skate boot defining a cavity to receive a foot of a user. The skate boot comprises a monolithic body comprising an ankle portion to receive an ankle of the user, a heel portion to receive a heel of the user's foot, a medial side portion to face a medial side of the user's foot, a lateral side portion to face a lateral side of the user's foot, a sole portion to face a plantar surface of the user's foot, and a toe portion to enclose toes of the user's foot. The monolithic body is injection molded such that the ankle portion, the heel portion, the medial side portion, the lateral side portion, the sole portion, and the toe portion are injection molded together and integral with one another. A thickness of the monolithic body varies. The skate boot also comprises lacing holes to receive a lace and extending through the monolithic body. The ice skate also comprises a blade holder and a blade held by the blade holder to engage ice.

In accordance with another aspect of the invention, there is provided a skate boot for a skate. The skate comprises a skating device disposed beneath the skate boot to engage a skating surface. The skate boot defines a cavity to receive a foot of a user and comprises a monolithic body comprising an ankle portion to receive an ankle of the user, a heel portion to receive a heel of the user's foot, a medial side portion to face a medial side of the user's foot, a lateral side portion to face a lateral side of the user's foot, a sole portion to face a plantar surface of the user's foot, and a toe portion to enclose toes of the user's foot. The monolithic body is injection molded such that the ankle portion, the heel portion, the medial side portion, the lateral side portion, the sole portion, and the toe portion are injection molded together and integral with one another. The skate boot also comprises lacing holes to receive a lace and extending through the monolithic body.

In accordance with another aspect of the invention, there is provided a skate boot for a skate. The skate comprises a skating device disposed beneath the skate boot to engage a skating surface. The skate boot defines a cavity to receive a foot of a user and comprises a body comprising an ankle portion to receive an ankle of the user, a heel portion to receive a heel of the user's foot, a medial side portion to face a medial side of the user's foot, and a lateral side portion to face a lateral side of the user's foot. The skate boot comprises a texture molded during molding of at least part of the body and simulating an appearance of a composite material.

These and other aspects of the invention will now become apparent to those of ordinary skill in the art upon review of the following description of embodiments of the invention in conjunction with the accompanying drawings.

BRIEF DESCRIPTION OF DRAWINGS

A detailed description of embodiments of the invention is provided below, by way of example only, with reference to drawings annexed hereto, in which:

FIG. 14 is a side elevation view of the skate illustrating various ornamental elements;

Figure 1:
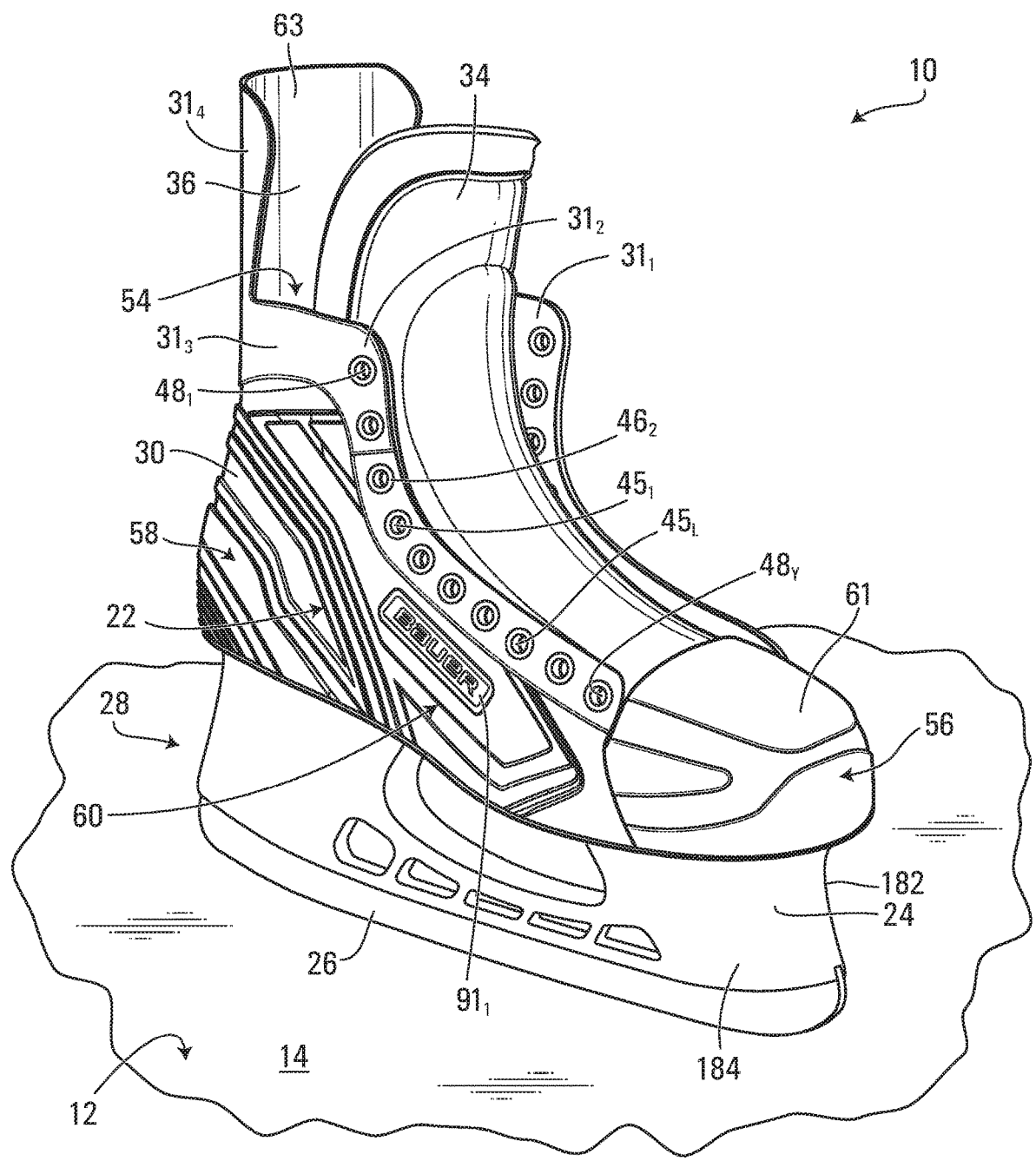
FIG. 1 is an example of a skate for a user in accordance with an embodiment of the invention.
Figure 2:
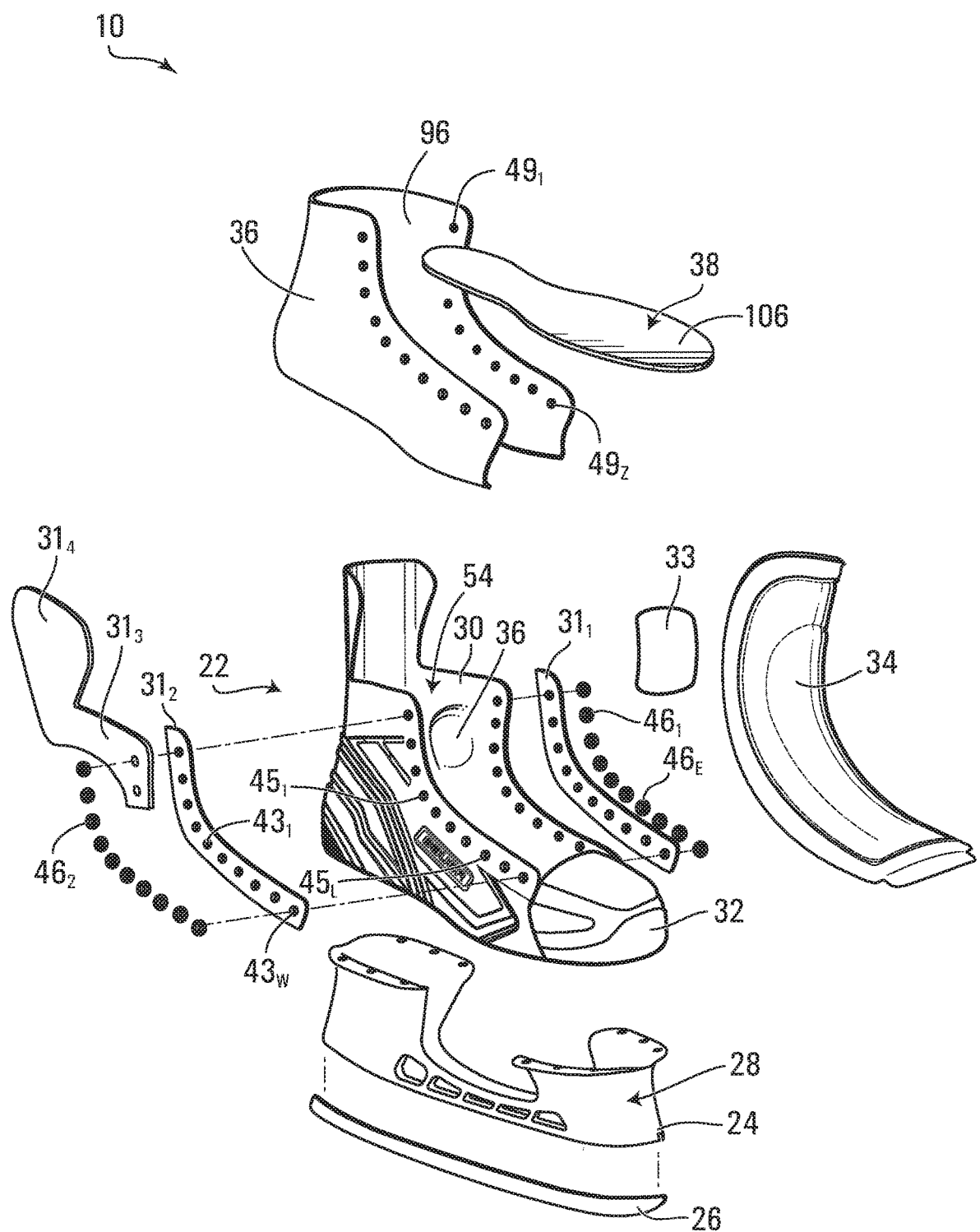
FIG. 2 is an exploded view of the skate.
Figure 3:
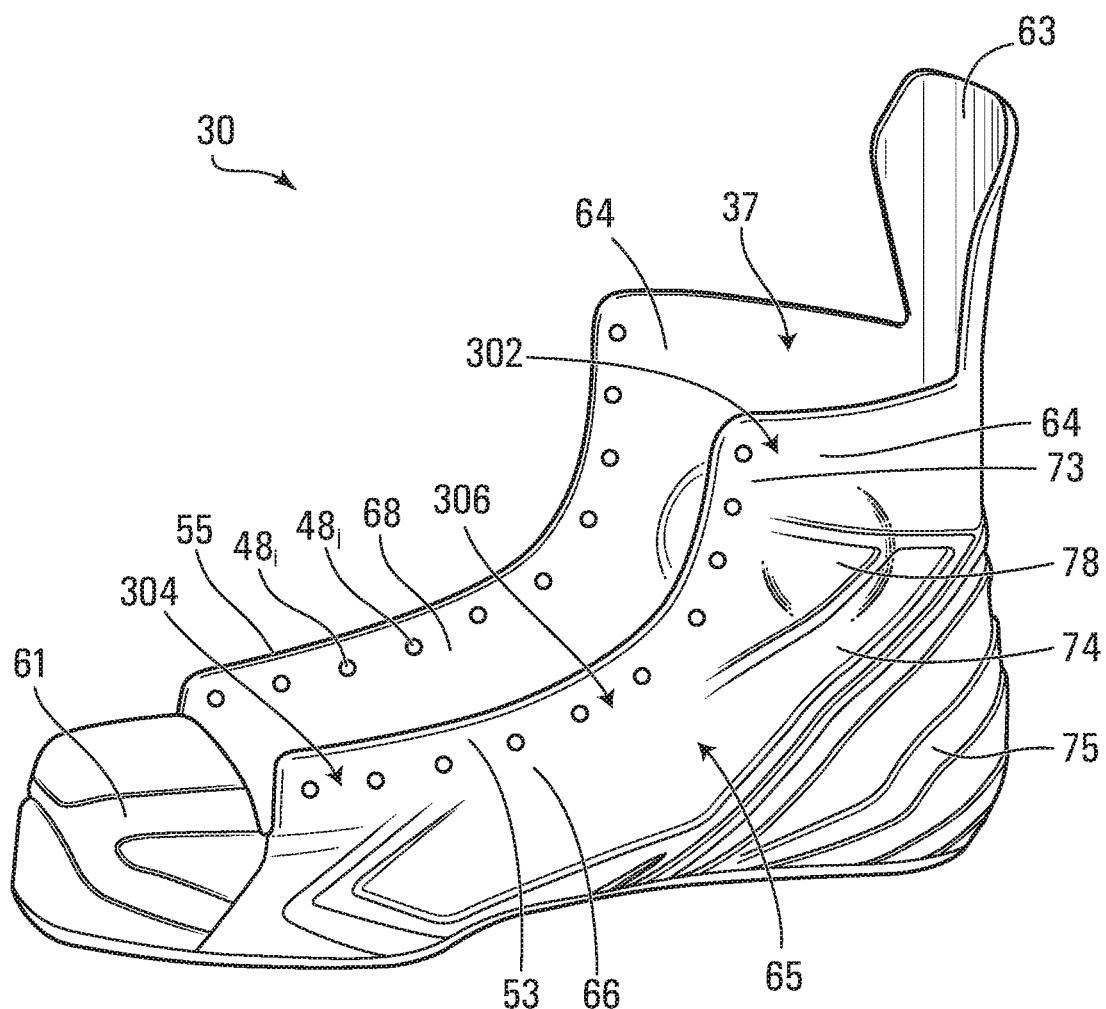
FIGS. 3 to 5 are perspective views of a body of a skate boot of the skate.
Figure 4:
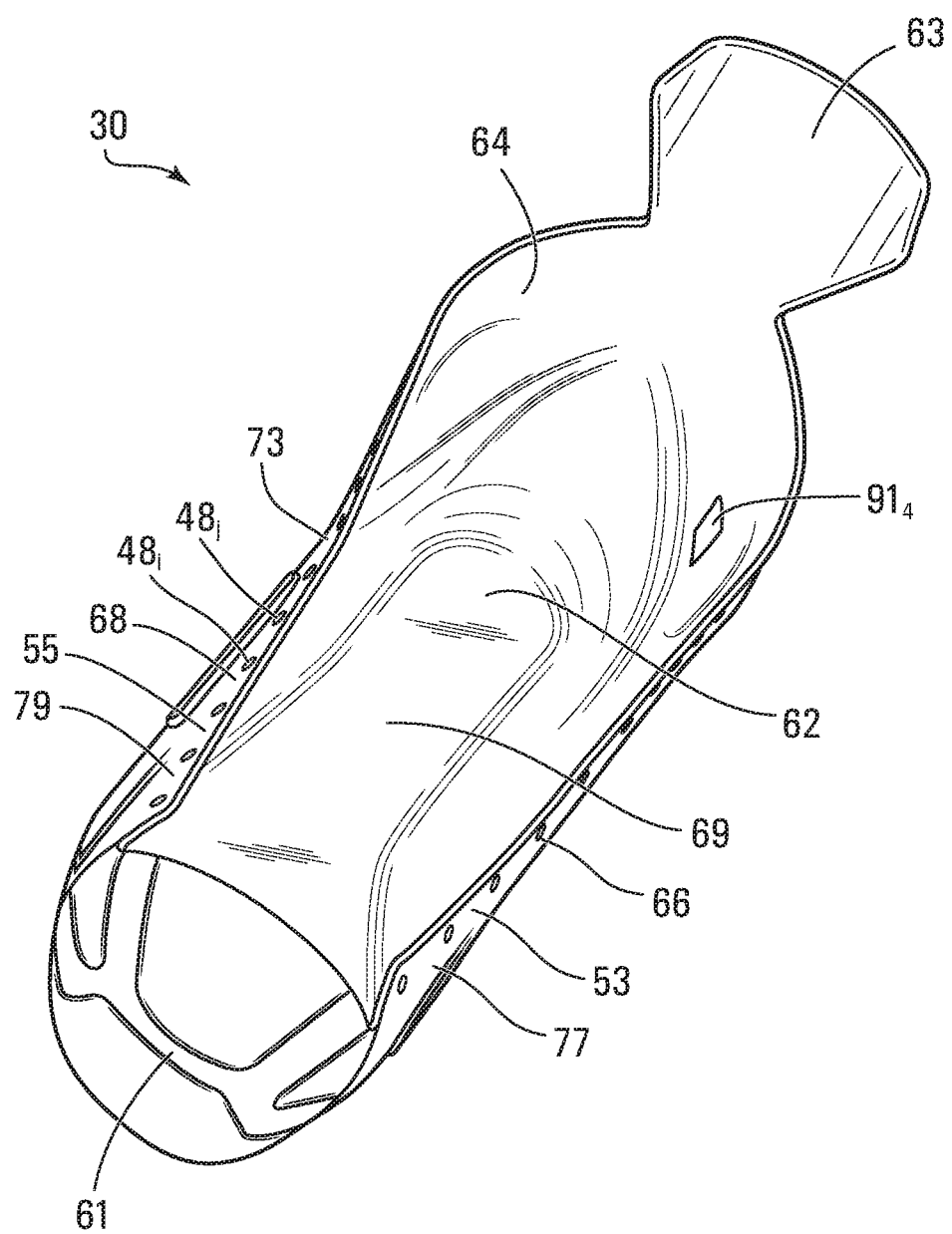
Figure 5:
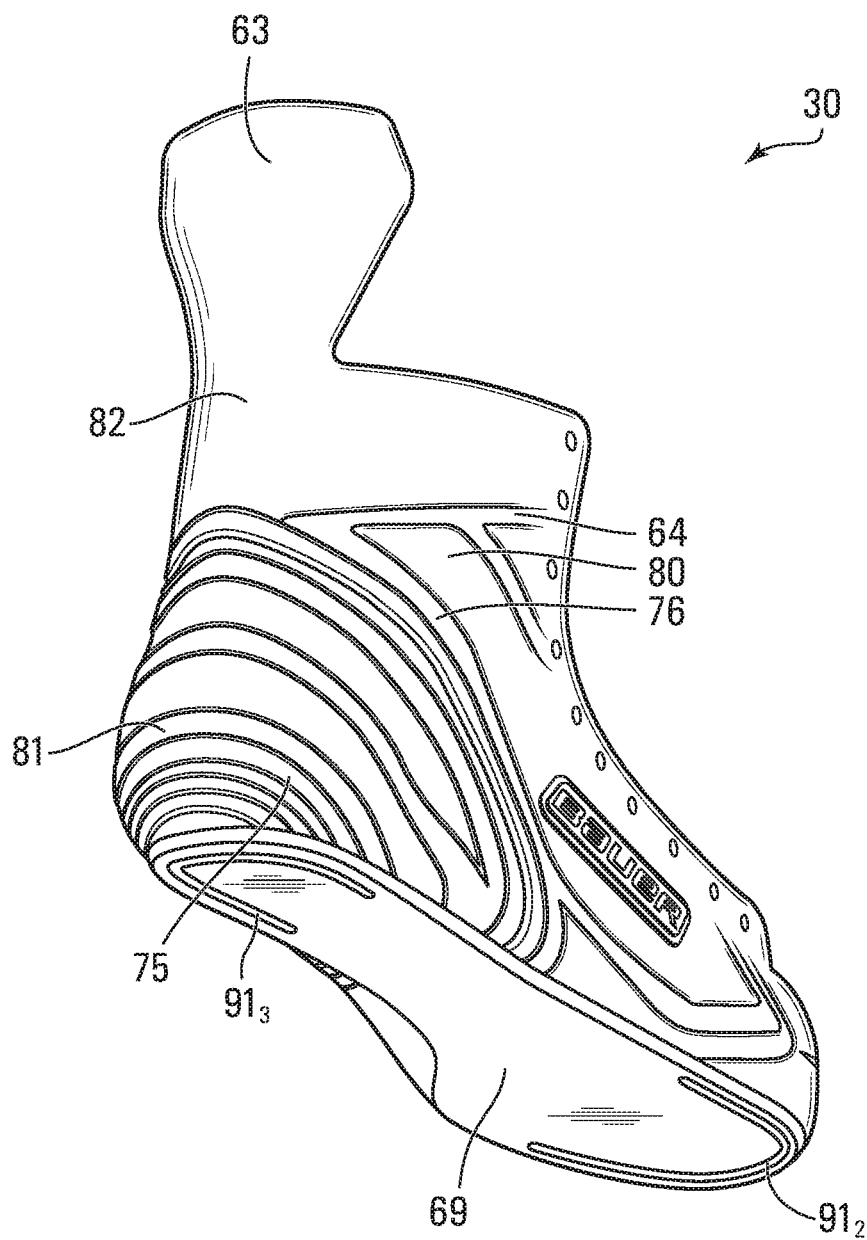

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF EMBODIMENTS

FIG. 1 shows an example of a skate 10 for a user to skate on a skating surface 12, in accordance with an embodiment of the invention. In this embodiment, the skate 10 is a hockey skate for the user who is a hockey player playing hockey. In this example, the skate 10 is an ice skate, a type of hockey played is ice hockey, and the skating surface 12 is ice 14.

The skate 10 comprises a skate boot 22 for receiving a foot 11 of the player and a skating device 28 disposed beneath the skate boot 22 to engage the skating surface 12. In this embodiment, the skating device 28 comprises a blade 26 for contacting the ice 14 and a blade holder 24 between the skate boot 22 and the blade 26. The skate 10 has a longitudinal direction, a widthwise direction, and a heightwise direction.

In this embodiment, as further discussed below, the skate boot 22 is constructed by injection molding so as to have useful performance and/or other characteristics (e.g., reduced weight; enhanced fit, comfort and range of motion; enhanced appearance; etc.) while being cost-effectively manufactured.

Figure 25:
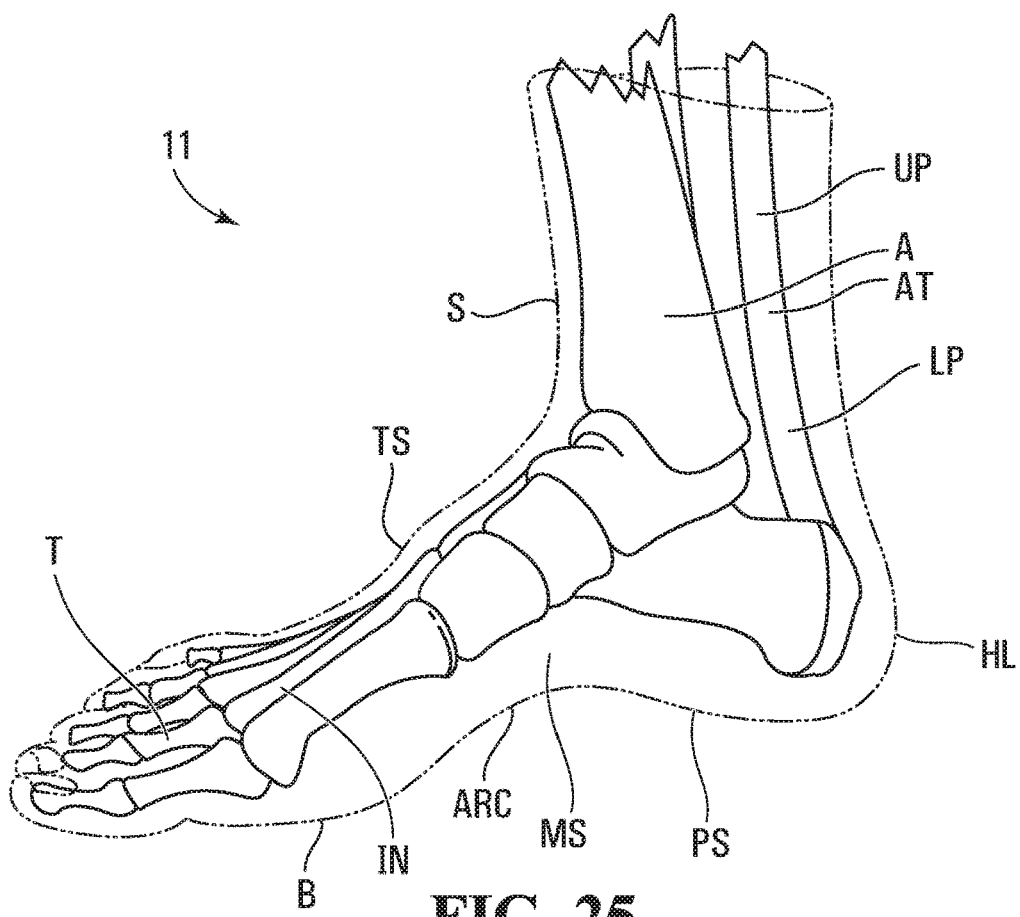
FIGS. 25 and 26 are side and front views of a right foot of the user with an integument of the foot shown in dotted lines and bones shown in solid lines.
Figure 26:
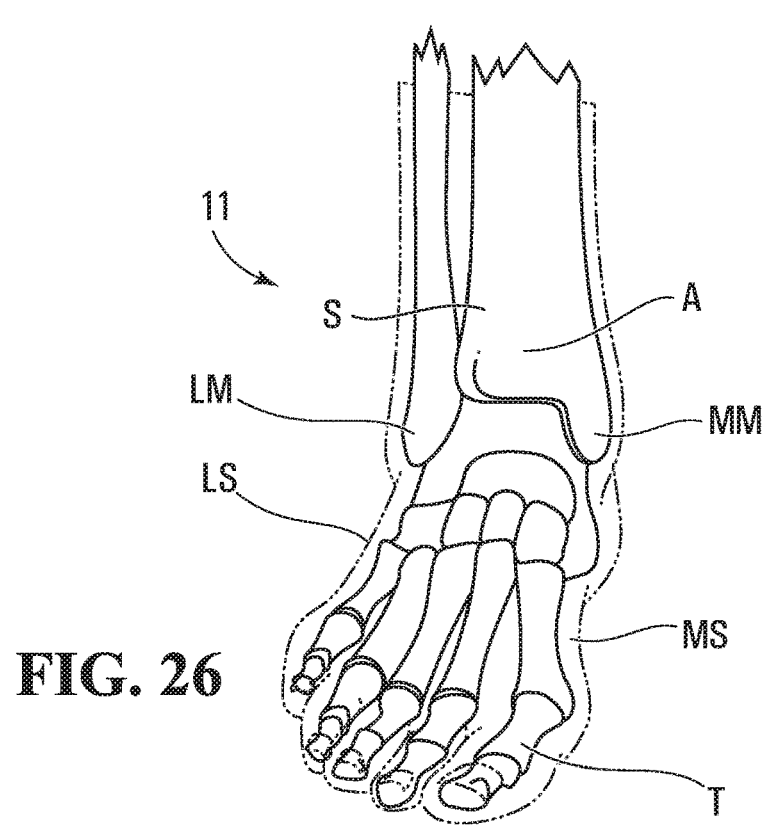

The skate boot 22 defines a cavity 54 for receiving the player's foot 11. With additional reference to FIGS. 25 and 26, the player's foot 11 includes toes T, a ball B, an arch ARC, a plantar surface PS, a top surface TS including an instep IN, a medial side MS, and a lateral side LS. The top surface TS of the player's foot 11 is continuous with a lower portion of a shin S of the player. In addition, the player has a heel HL, an Achilles tendon AT, and an ankle A having a medial malleolus MM and a lateral malleolus LM that is at a lower position than the medial malleolus MM. The Achilles tendon AT has an upper part UP and a lower part LP projecting outwardly with relation to the upper part UP and merging with the heel HL. A forefoot of the player includes the toes T and the ball B, a hindfoot of the player includes the heel HL, and a midfoot of the player is between the forefoot and the hindfoot.

The skate boot 22 comprises a front portion 56 for receiving the toes T of the player, a rear portion 58 for receiving the heel HL and at least part of the Achilles tendon AT and the ankle A of the player, and an intermediate portion 60 between the front portion 56 and the rear portion 58.

More particularly, in this embodiment, with additional reference to FIGS. 2 to 5, the skate boot 22 comprises a body 30 and a plurality of components affixed to or otherwise supported by the body 30, which in this embodiment includes overlays $31_1$-$31_N$, a tongue 34, a liner 36 and a footbed 38. The skate boot 22 also comprises lacing holes $45_1$-$45_L$ to receive a lace 47 (shown in FIG. 11) and extending through the body 30, the liner 36, and the overlays $31_1$, $31_2$ which are medial and lateral facings, respectively. In this example, eyelets $46_1$-$46_E$ are provided in respective ones of the lacing holes $45_1$-$45_L$ to engage the lace 47.

The body 30 imparts strength and structural integrity to the skate 10 to support the player's foot 11. In this embodiment, the body 30 comprises a heel portion 62 for receiving the heel HL of the player, an ankle portion 64 for receiving the ankle A of the player, and medial and lateral side portions 66, 68 for respectively facing the medial and lateral sides MS, LS of the player's foot 11. The body 30 thus includes a quarter 75 which comprises a medial quarter part 77, a lateral quarter part 79, and a heel quarter 81. The heel portion 62 may be formed such that it is substantially cup-shaped for following a contour of the heel HL of the player. The ankle portion 64 comprises medial and lateral ankle sides 74, 76. The medial ankle side 74 has a medial depression 78 for receiving the medial malleolus MM of the player and the lateral ankle side 76 has a lateral depression 80 for receiving the lateral malleolus LM of the player. The lateral depression 80 is located slightly lower than the medial depression 78 for conforming to the morphology of the player's foot 11. In this example, the body 30 also comprises a sole portion 69 for facing the plantar surface PS of the player's foot 11, a toe portion 61 for enclosing the toes T of the player, and a tendon guard portion 63 for facing the upper part UP of the Achilles tendon AT of the player.

In this embodiment, the body 30 is a monolithic body, i.e., a one-piece body made by molding (e.g. injection molding), as discussed later.

More particularly, in this embodiment, the monolithic body 30 is injection molded such that the ankle portion 64, the heel portion 62, the medial side portion 66, the lateral side portion 68, the sole portion 69, the toe portion 61, and the tendon guard portion 63 are injection molded together and integral with one another. That is, the ankle portion 64, the heel portion 62, the medial side portion 66, the lateral side portion 68, the sole portion 69, the toe portion 61, and the tendon guard portion 63 are injection molded together as a single piece.

Figure 6:
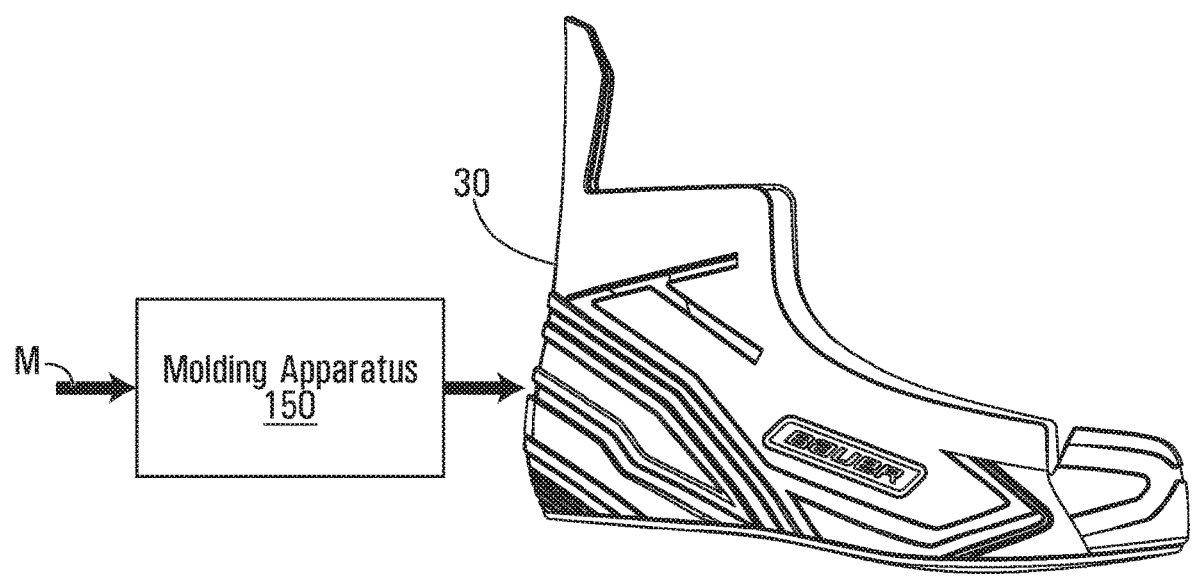
FIG. 6 is a block diagram showing a molding process implementing a molding apparatus to form the body of the skate boot.

To that end, the monolithic body 30 comprises one or more materials M injection molded into a shape of the monolithic body 30 by flowing the one or more materials in a molding apparatus 150 during an injection molding process, as shown in FIG. 6. Any suitable material M may be used to make the monolithic body 30. For example, in this embodiment, a polymeric material such as polyethylene, polypropylene, polyurethane (PU), ethylene-vinyl acetate (EVA), nylon, polyester, vinyl, polyvinyl chloride, polycarbonate, an ionomer resin (e.g., Surlyn®), styrene-butadiene copolymer (e.g., K-Resin®) etc.), self-reinforced polypropylene composite (e.g., Curve®), glass reinforced materials and/or any other thermoplastic or thermosetting polymer may be used.

Figure 7A:
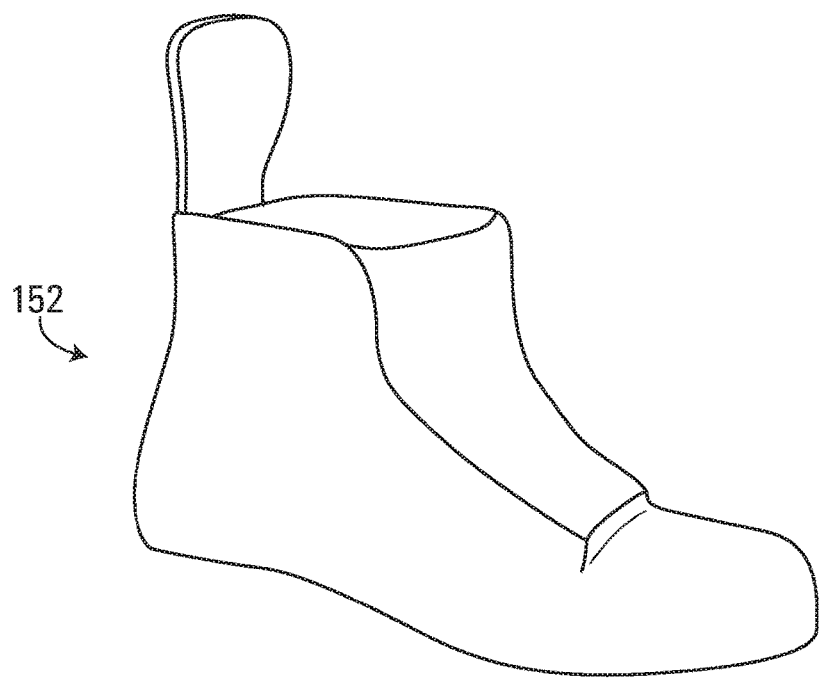
FIG. 7A is an example of a male mold element of the molding apparatus.
Figure 8:
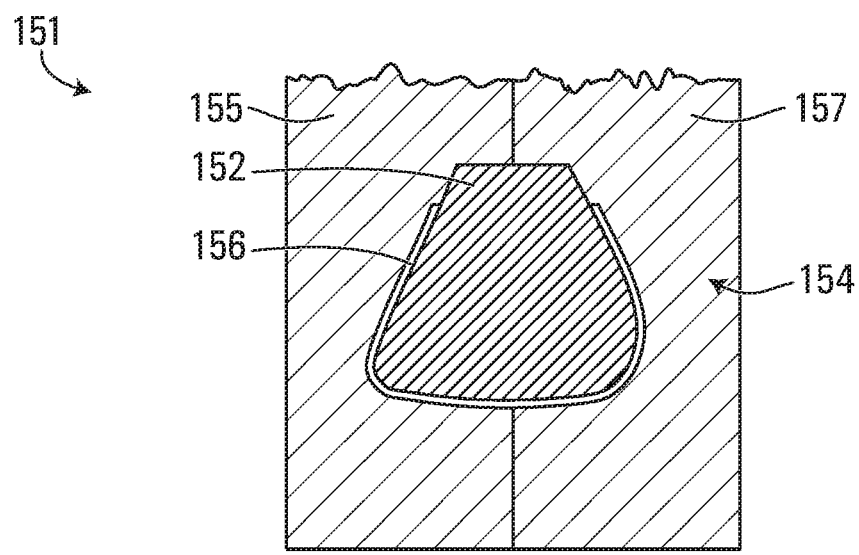
FIG. 8 is a cross-sectional view of the male mold element and a female mold element of the molding apparatus.

Referring additionally to FIGS. 6, 7A and 8, in this embodiment, the molding apparatus 150 comprises a mold 151 including a male mold element 152 (which may also be referred to as a male form or "last") and a female mold element 154 between which the one or more materials M are molded to form the monolithic body 30, with the female mold element 154 containing the male mold element 152 during the molding process. In this embodiment, the female mold element 154 comprises first and second portions 155, 157 that are secured together to contain the male mold element 152.

An example of a method for molding the monolithic body 30 by injecting the one or more materials M into the molding apparatus 150 will now be described. In order to mold the monolithic body 30, the male mold element 152 is secured within the female mold element 154 to form a mold cavity 156 between the male mold element 152 and the female mold element 154. The mold cavity 156 has a shape corresponding to a desired shape of the monolithic body 30. The mold cavity 156 is then filled with one or more materials M via a sprue, runner and gate system (not shown) of the female mold element 154 and left to cure. Upon curing of the one or more materials M for a sufficient amount of time to form the monolithic body 30, the female mold element 154 is opened (i.e., its first and second portions 155, 157 are separated from one another) and removed from the molding apparatus 150 while the male mold element 152 remains on the molding apparatus 150 with the monolithic body 30 still on it. The monolithic body 30 may then be demolded from (i.e., removed from) the male mold element 152. This may be achieved in various ways. For instance, in some cases, the one or more materials M may have sufficient elasticity to allow an operator of the molding apparatus 150 to remove the monolithic body 30 from the male mold element 152 by flexing the monolithic body 30. In other cases, the monolithic body 30 may be removed from the male mold element 152 while at least part of the monolithic body 30 has not fully cured such that the monolithic body 30 has some flexibility that it would not have if it had fully cured. Moreover, in some cases, the male mold element 152 may be inflatable such that it can be expanded and retracted by controlling a fluid pressure within it. For instance, the inflatable male mold element 152 may be filled with air (or any other fluid) to expand it to a "molding" size at which the molding process is carried out, and then emptied of air to contract it to a "demolding" size that is less than the molding size and at which the demolding of the monolithic body 30 from the male molding element 152 can be carried out. In some cases, the male mold element 152 may comprise a plurality of pieces that may be disassembled to facilitate removal of the monolithic body 30 from the male mold element 152.

The monolithic body 30 may be manufactured by injection molding in various other ways and other techniques may be used in other embodiments.

In this embodiment, different parts of the monolithic body 30 may vary in stiffness for fit, comfort, performance, and/or other reasons.

Figure 9:
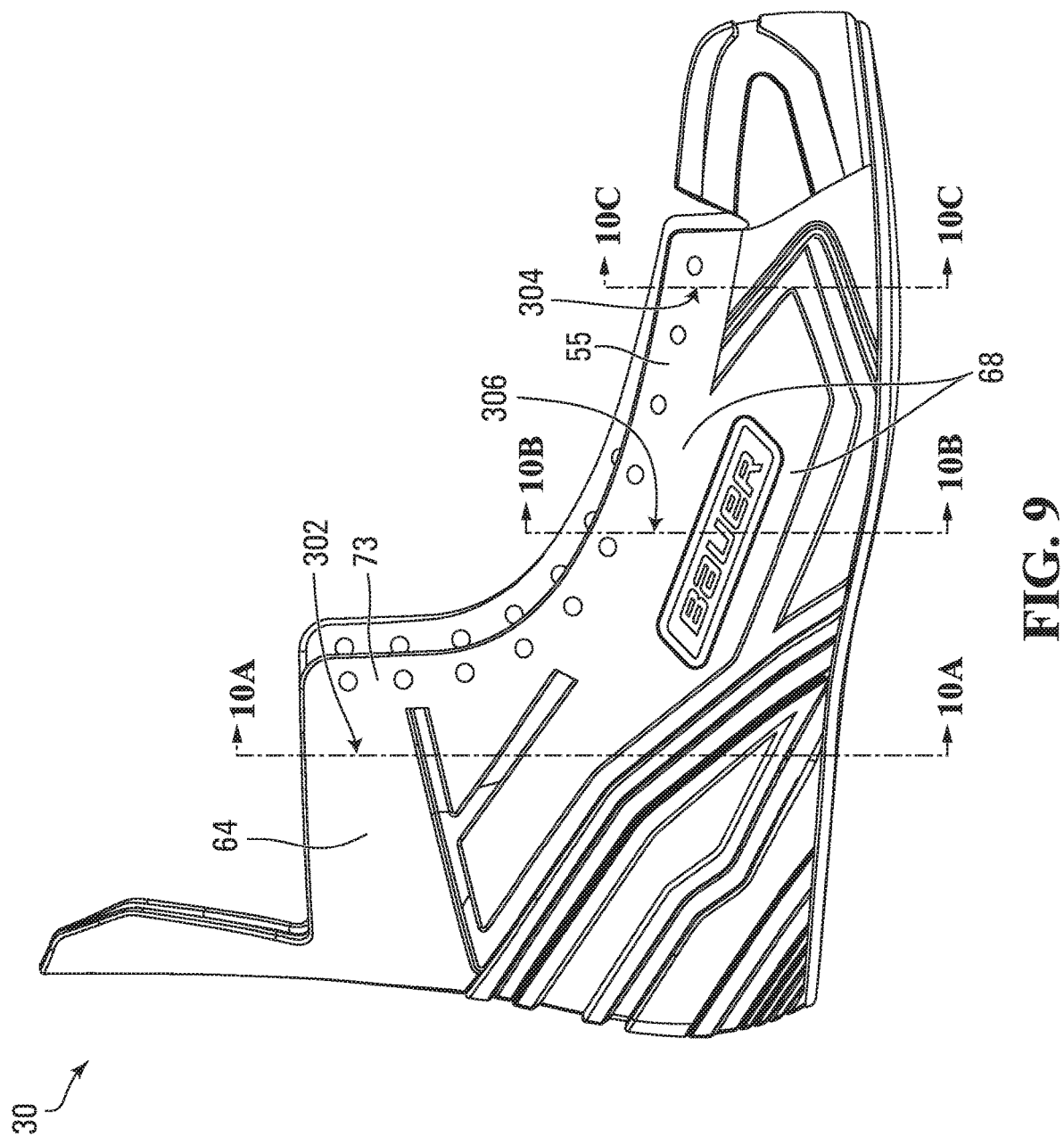
FIG. 9 is a lateral side plan view of the body of the skate boot.

For example, in this embodiment, with additional reference to FIG. 9, an upper part 302 of the monolithic body 30 is stiffer than a lower part 304 of the monolithic body 30. In this case, the upper part 302 of the monolithic body 30 is stiffer than the lower part 304 of the monolithic body 30 to facilitate forward flex of the player's ankle by opposing overtightening of the ankle portion 64 about the user's ankle A and facilitate tightening of the medial side portion 66 and lateral side portion 68 about the instep IN of the player.

To that end, in this example, the upper part 302 of the monolithic body 30 includes a part 73 of the ankle portion 64 and the lower part 304 of the monolithic body 30 includes respective parts 53, 55 of the medial side portion 66 and the lateral side portion 68. For instance, the part 73 of the ankle portion 64 that is stiffer may include the medial and lateral ankle sides 74 76 of a collar of the ankle portion 64 that comprises upper ones of the lacing holes $45_1$-$45_L$, and the parts 53, 55 of the medial side portion 66 and lateral side portion 68 of the monolithic body 30 are configured to overlie the instep IN of the player's foot and include lower ones of the lacing holes $45_1$-$45_L$ so that they can be moved more easily closer to the instep IN of the player's foot when donning the skate 10.

Figure 10:
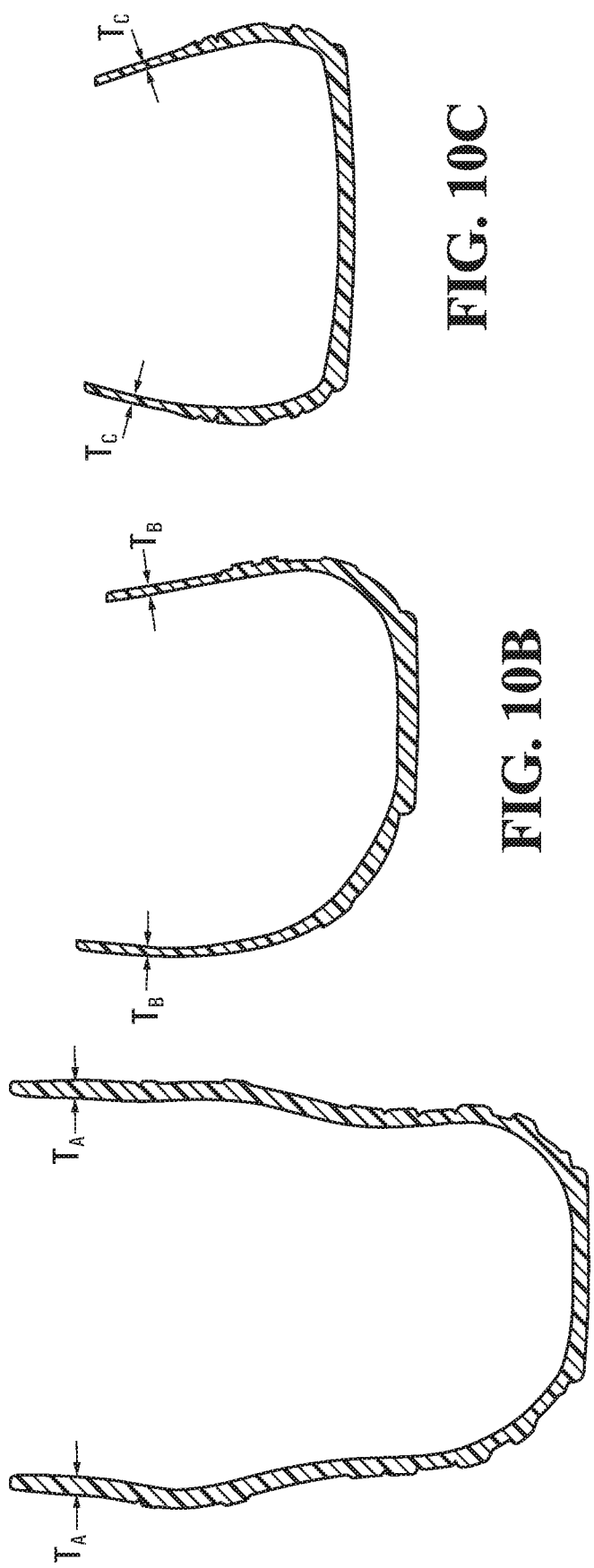
FIG. 10A is a cross-sectional view of the body of the skate boot taken along line 10A-10A of FIG. 9.
FIG. 10B is a cross-sectional view of the body of the skate boot taken along line 10B-10B of FIG. 9.
FIG. 10C is a cross-sectional view of the body of the skate boot taken along line 10C-10C of FIG. 9.

More particularly, with additional reference to FIGS. 10A, 10B and 10C, in this embodiment, a thickness T of the monolithic body 30 varies to achieve variations in stiffness of the monolithic body 30. In this example, the thickness T of the upper part 302 of the monolithic body 30, which is also denoted $T_A$, is greater than the thickness T of the lower part 304 of the monolithic body 30, which is also denoted $T_C$. For example, in some embodiments, a ratio of the thickness $T_A$ of the upper part 302 of the monolithic body 30 over the thickness $T_C$ of the lower part 304 of the monolithic body 30 may be at least 1.2, in some cases at least 1.3, in some cases at least 1.4, in some cases at least 1.5, and in some cases even more.

Also, in this embodiment, the thickness $T_A$ of the upper part 302 of the monolithic body 30 is greater than the thickness T of an intermediate part 306 of the monolithic body 30, denoted $T_B$, where the intermediate part 306 is located between the upper part 302 and the lower part 304 of the monolithic body 30 in the heightwise direction of the skate 10. In this embodiment, the intermediate part 306 of the monolithic body 30 is located about an upper area of the medial side portion 66 and the lateral side portion 68 proximate to the ankle portion 64 and the lower part 304 of the monolithic body 30 is located about a lower area of the medial side portion 66 and the lateral side portion 68 proximate to the toe portion 61. In this embodiment, the thickness $T_B$ of the intermediate part 306 of the monolithic body 30 is greater than the thickness $T_C$ of the lower part 304 of the monolithic body 30.

To that end, in this embodiment, both the intermediate part 306 and the lower part 304 of the monolithic body 30 include respective parts of the medial side portion 66 and the lateral side portion 68 about the instep IN of the player's foot and the monolithic body 30 is arranged such that the thickness T of the monolithic body 30 decreases from the intermediate part 306 towards the lower part 304 of the monolithic body 30 along the medial side portion 66 and the lateral side portion 68 about the instep IN of the player's foot. In this case, the intermediate part 308 of the monolithic body 30 is stiffer than the lower part 304 of the monolithic body 30. In other embodiments, thickness T of the monolithic body 30 may be substantially identical at the intermediate part 306 and the lower part 304 of the monolithic body 30, resulting in substantially identical stiffness in both the lower and intermediate parts 304, 306 of the monolithic body 30.

Although it is illustrated in the embodiments in FIGS. 10A, 10B and 10C that the thickness T of the monolithic body 30 on both the medial and lateral side portions 66 68 is the same (or similar), in other embodiments, the thickness T of the monolithic body 30 on the medial side portion 66 of the upper part 302 of the monolithic body 30 may be different from the thickness T of the monolithic body 30 on the lateral side portion 68 of the upper part 302 of the monolithic body 30. Likewise, the thickness T of the monolithic body 30 on the medial side portion 66 of the lower part 304 of the monolithic body 30 may be different from the thickness T of the monolithic body 30 on the lateral side portion 68 of the lower part 304 of the monolithic body 30. Similarly, the thickness T of the monolithic body 30 on the medial side portion 66 of the intermediate part 306 of the monolithic body 30 may be different from the thickness T of the monolithic body 30 on the lateral side portion 68 of the intermediate part 306 of the monolithic body 30.

For example, in some embodiments, the thickness T of the monolithic body 30 on the medial side portion 66 of the upper part 302 may be greater than the thickness T of the monolithic body 30 on the lateral side portion 68 of the upper part 302; the thickness T of the monolithic body 30 on the medial side portion 66 of the lower part 304 may be greater than the thickness T of the monolithic body 30 on the lateral side portion 68 of the lower part 304; and/or the thickness T of the monolithic body 30 on the medial side portion 66 of the intermediate part 306 may be greater than the thickness T of the monolithic body 30 on the lateral side portion 68 of the intermediate part 306. Conversely, in other embodiments, the thickness T of the monolithic body 30 on the medial side portion 66 of the upper part 302 may be less than the thickness T of the monolithic body 30 on the lateral side portion 68 of the upper part 302; the thickness T of the monolithic body 30 on the medial side portion 66 of the lower part 304 may be less than the thickness T of the monolithic body 30 on the lateral side portion 68 of the lower part 304; and/or the thickness T of the monolithic body 30 on the medial side portion 66 of the intermediate part 306 may be less than the thickness T of the monolithic body 30 on the lateral side portion 68 of the intermediate part 306.

In this embodiment, the thickness T of the upper part 302 of the monolithic body 30 on the medial side portion 66 is greater than the thickness T of the lower part 304 of the monolithic body 30 on the medial side portion 66. Likewise, in this embodiment, the thickness T of the upper part 302 of the monolithic body 30 on the lateral side portion 68 is greater than the thickness T of the lower part 304 of the monolithic body 30 on the later side portion 68.

In this example, the thickness T of the upper part 302 of the monolithic body 30 on the medial side portion 66 is greater than the thickness T of the intermediate part 306 of the monolithic body 30 on the medial side portion 66 and the thickness T of the intermediate part 306 of the monolithic body 30 on the medial side portion 66 is greater than the thickness T of the lower part 304 of the monolithic body 30 on the medial side portion 66; and/or the thickness T of the upper part 302 of the monolithic body 30 on the lateral side portion 68 is greater than the thickness T of the intermediate part 306 of the monolithic body 30 on the lateral side portion 68 and the thickness T of the intermediate part 306 of the monolithic body 30 on the lateral side portion 68 is greater than the thickness T of the lower part 304 of the monolithic body 30 on the lateral side portion 68.

Figure 11:
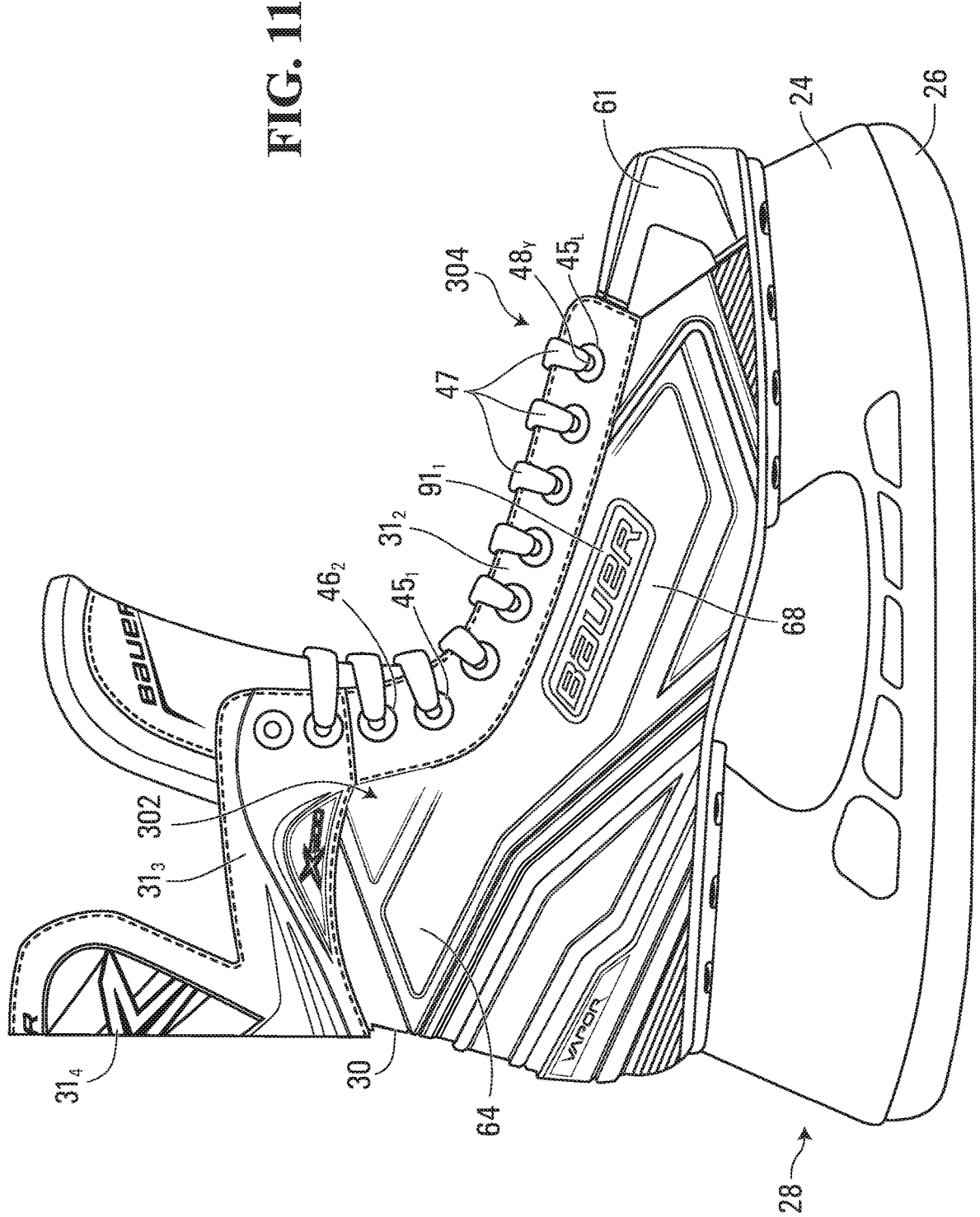
FIG. 11 is a side elevation view of the skate.

With additional reference to FIG. 11, the overlays $31_1$-$31_N$ may be provided on the monolithic body 30 for functional and/or aesthetic purposes. In this embodiment, the overlays $31_1$-$31_N$ are provided on an external surface 65 of the monolithic body 30. The overlays $31_1$-$31_N$ may be made of one or more overlay materials, which may include thermoplastic polyurethane (TPU), polyvinyl chloride (PVC), NYLON®, polyurethane, leather, any synthetic material that resembles leather, and/or any other suitable material.

More particularly, in this embodiment, the medial and lateral facings $31_1$, $31_2$ are provided on the external surface 65 of the monolithic body 30 along the medial and lateral side portions 66, 68, respectively. In this embodiment, the overlay $31_3$ is a collar facing on the external surface 65 of the ankle portion 64 of the monolithic body 30, and the overlay $31_4$ is a tendon guard overlay on the external surface 65 of the tendon guard portion 63 of the monolithic body 30. In some cases, the collar facing overlay $31_3$ and the tendon guard overlay $31_4$ may be a single one-piece overlay member. In other cases, the collar facing overlay $31_3$ and the tendon guard overlay $31_4$ may be separate overlay members.

The overlays $31_1$-$31_N$ may be affixed to the monolithic body 30 in various ways. For instance, in some embodiments, each of the overlays $31_1$-$31_N$ may be fastened to the external surface 65 of the monolithic body 30 (e.g., via stitching, staples, etc.), glued or otherwise adhesively bonded thereto via an adhesive, or ultrasonically bonded. The overlays $31_1$-$31_N$ may be affixed to the external surface 65 of the monolithic body 30 in any other suitable way.

Figure 12:
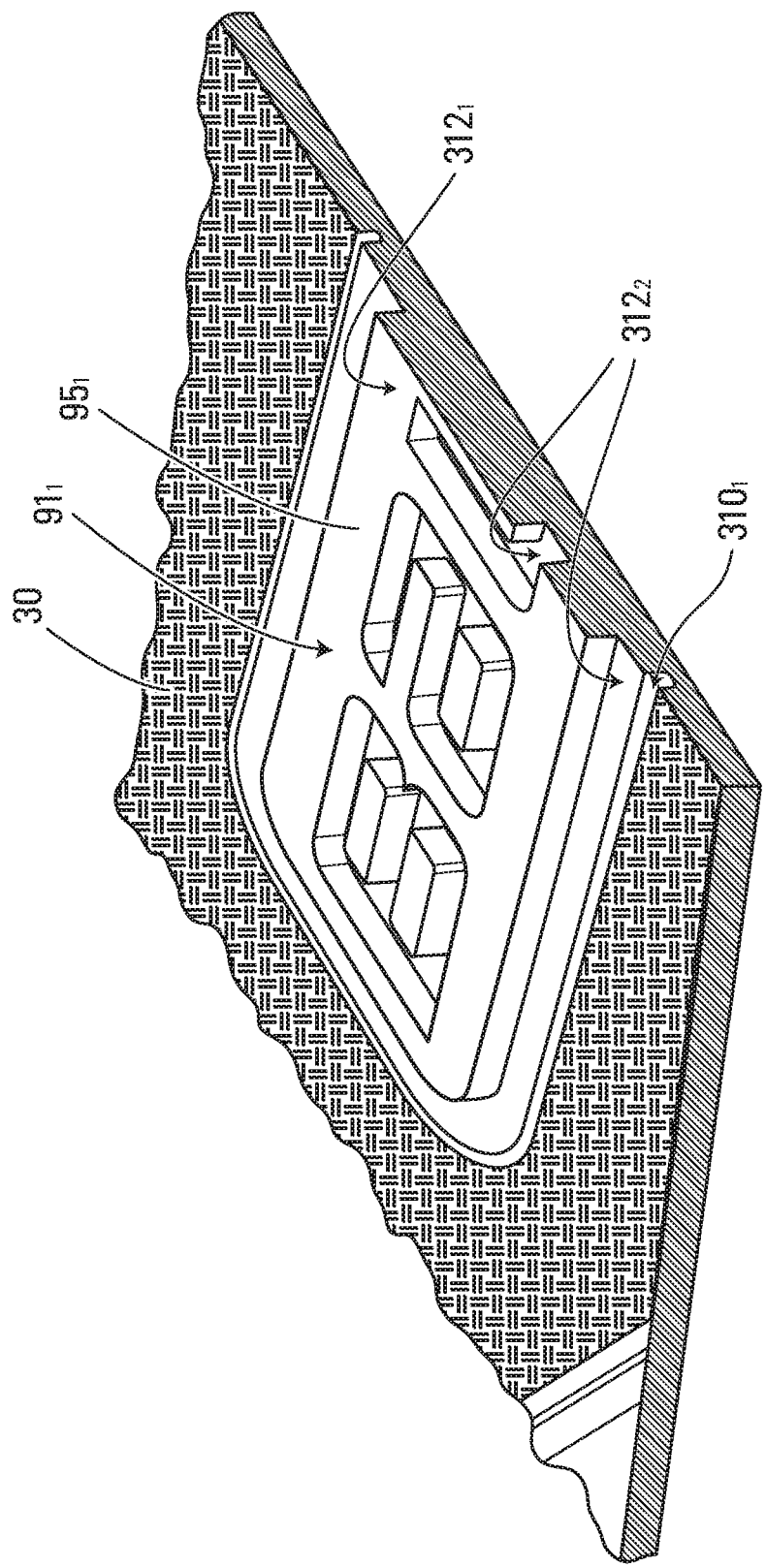
FIG. 12 is a perspective view of part of the body of the skate boot illustrating part of a mark.
Figure 13A:
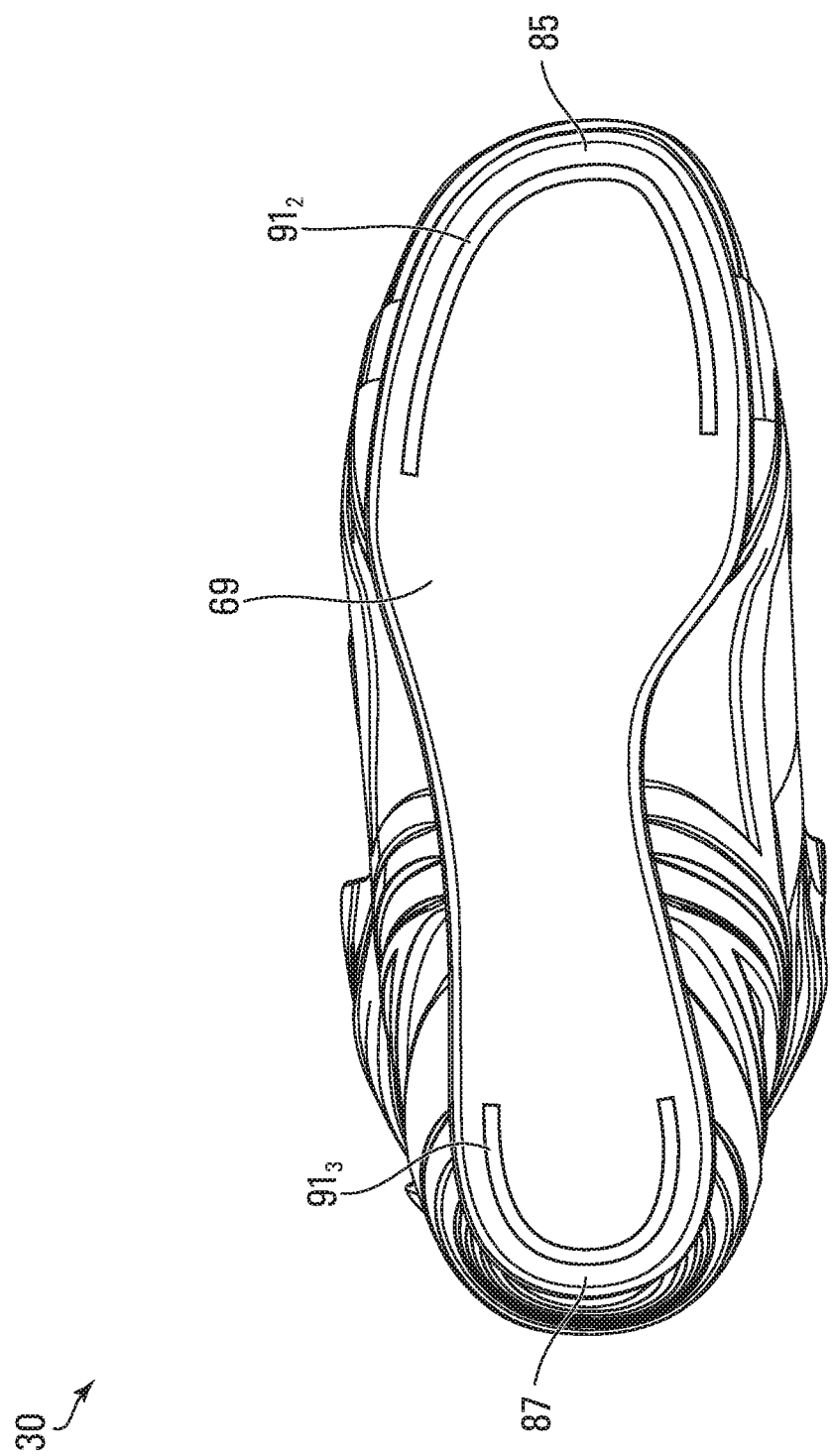
FIG. 13A is a bottom plan view of the body of the skate boot illustrating positional markers.

With additional reference to FIGS. 12 and 13A, in this embodiment, the monolithic body 30 comprises marks $91_1$-$91_M$ created while the monolithic body 30 is injection molded. That is, the marks $91_1$-$91_M$ are molded marks integrally formed when molding the monolithic body 30.

In this embodiment, the mark $91_1$ is a logo that is defined by one or more recesses $310_1$-$310_D$ (which include lowered surfaces) of the monolithic body 30 and/or one or more projections $312_1$-$312_E$ (which include raised surfaces) of the monolithic body 30. In other words, the mark $91_1$ is provided in the monolithic body 30 by varying the thickness T of the monolithic body 30 to define a shape of the logo.

Also, in this embodiment, each of the marks $91_2$, $91_3$ and $91_4$ is a positional marker which may be used to position a component of the skate boot 22 on the monolithic body 30. For instance, each of the positional markers $91_2$, $91_3$ and $91_4$ may include one or more recesses and/or one or more projections molded with the monolithic body 30 for aligning a component of the skate boot 22 on the monolithic body 30. The positional markers $91_2$, $91_3$ and $91_4$ may help to eliminate guess work and human error in positioning components of the skate boot 22 on the monolithic body 30 during manufacturing, which may lead to increase in quality and/or productivity.

Figure 13B:
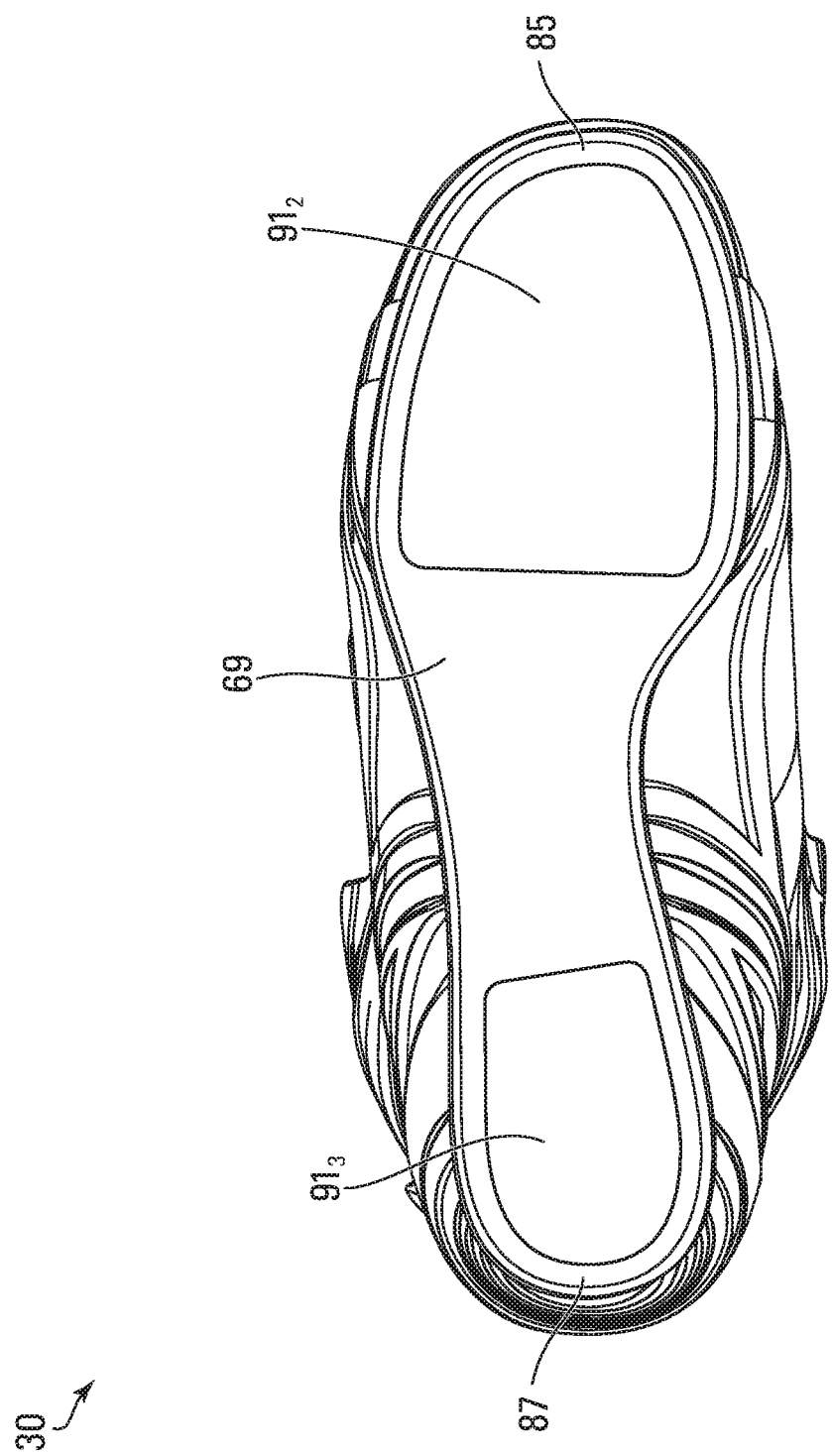
FIGS. 13B to 13E are bottom plan views of the body of the skate boot illustrating variants of the positional markers in accordance with embodiments of the invention.

For example, in this embodiment, the positional markers $91_2$ and $91_3$ are disposed on the sole portion 69 for positioning the skating device 28 on the skate boot 22. In this embodiment, the positional marker $91_2$ is a front positional marker located at a front 85 of the sole portion 69 for positioning a front parting line 81 of the skating device 28 on the sole portion 69 and the positional marker $91_3$ is a back positional marker located at a back 87 of the sole portion 69 for positioning a back parting line 83 of the skating device 28 on the sole portion 69. Although in this embodiment the positional markers $91_2$ and $91_3$ are shown as curved lines, the shape of the positional markers $91_2$ and $91_3$ may vary from the shape shown in the drawings. In other embodiments, for example with reference to FIG. 13B, the positional markers $91_2$ and $91_3$ may be markings that substantially correspond with shapes of respective outlines 92, 94 of respective connecting portions 98, 99 of the skating device 28. Any other suitable shape may be used for the positional markers $91_2$ and $91_3$ in other embodiments. The positional markers $91_2$ and $91_3$ may be thus be disposed on the sole portion 69 for positioning the blade holder 24 on to the skate boot 22.

In other embodiments, there may be any other number of positional markers such as the positional markers $91_2$ and $91_3$ disposed on the sole portion 69 for positioning the skating device 28 on to the skate boot 22, such as less than two (i.e., a single positional marker) or more than two.

Figure 13C:
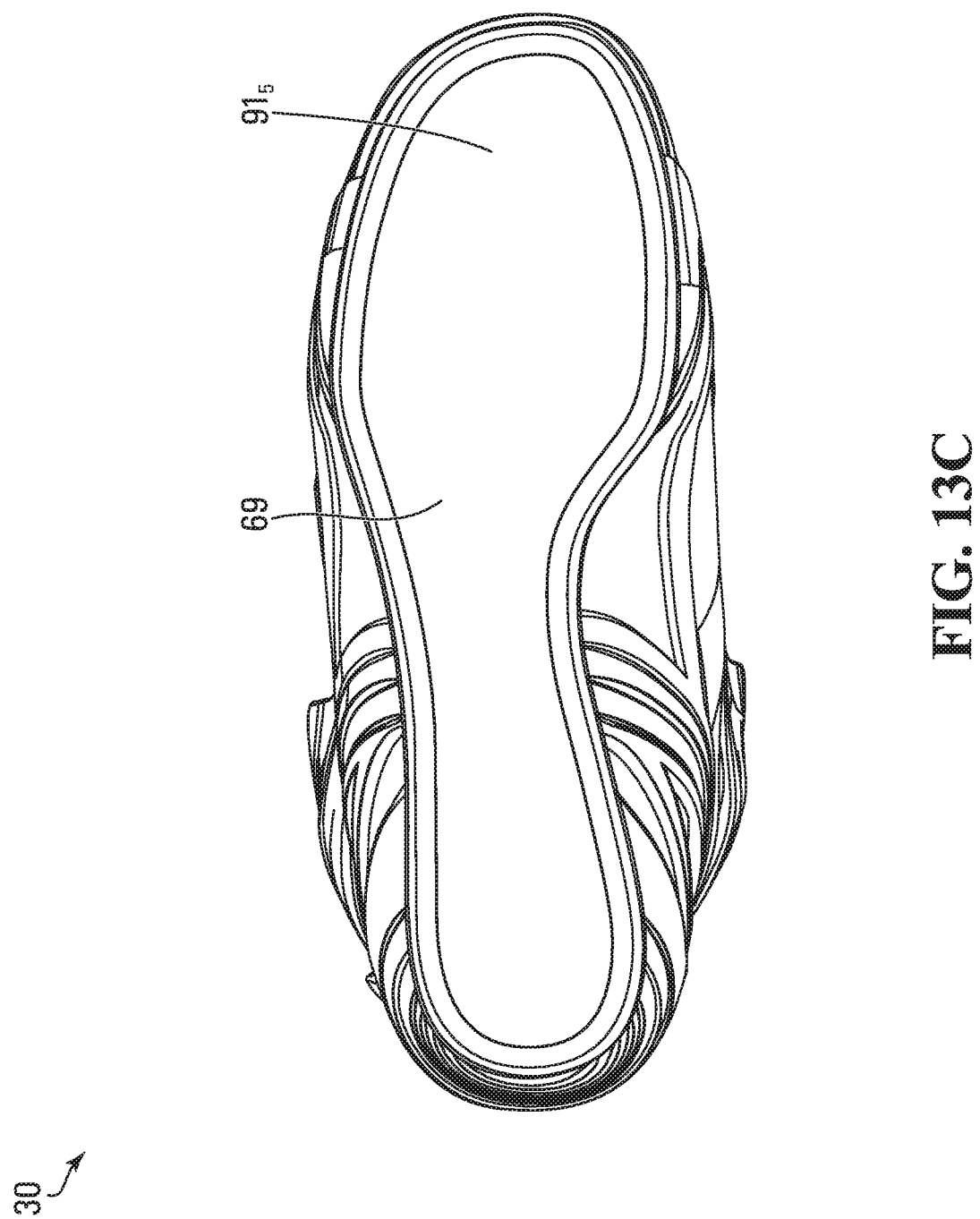

For example, in other embodiments, as shown in FIG. 13C, the sole portion 69 may have a single positional marker $91_5$ that substantially corresponds with a shape of an outline of an interface of the skating device 28 with the sole portion 69. In other embodiments, a single positional marker located at any suitable position on the sole portion 69 may be used for positioning the skating device 28 on the sole portion 69.

Figure 13D:
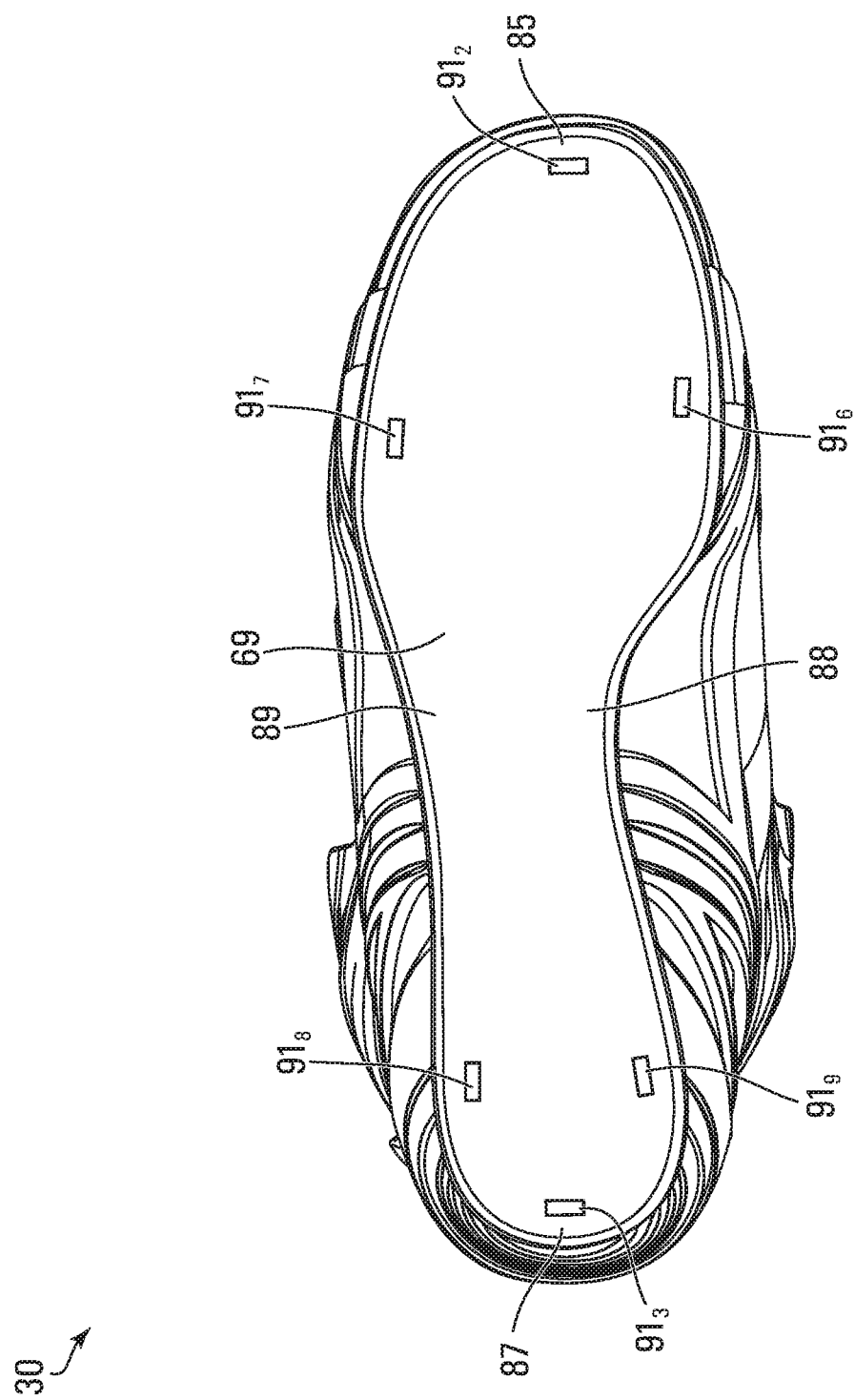

In other embodiments, for example with reference to FIG. 13D, the front positional marker $91_2$, the back positional marker $91_3$ and one or more side positional markers $91_6$, $91_7$, $91_8$, $91_9$ located on one or more of the medial or lateral sides 88, 89 of the sole portion 69 may be used for positioning the skating device 28 on the sole portion 69.

Figure 7B:
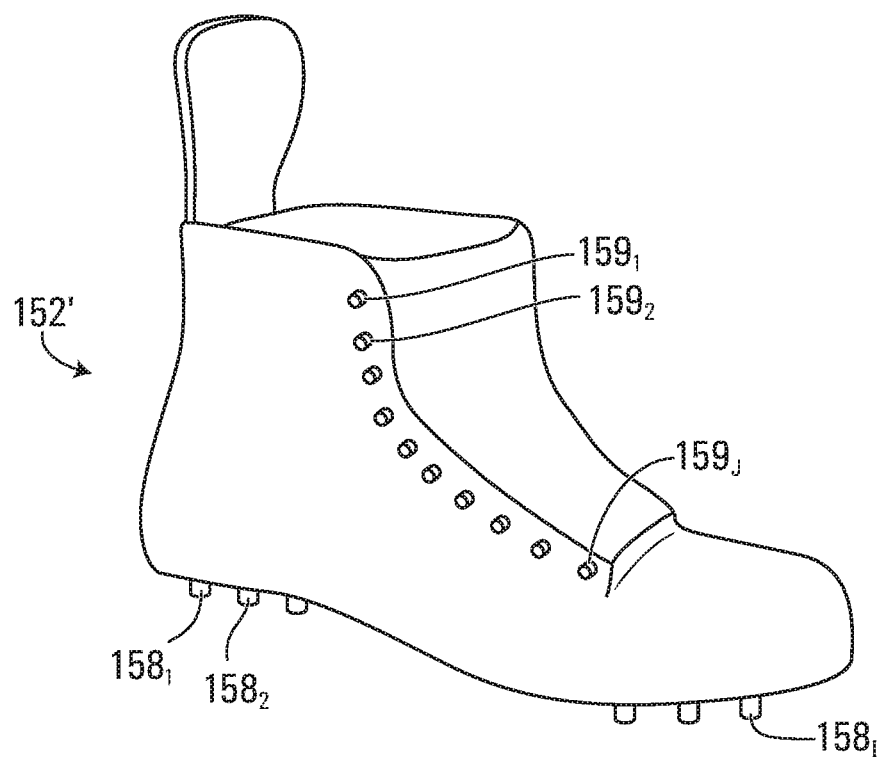
FIG. 7B is an example of a variant of the male mold element of the molding apparatus in accordance with an embodiment of the invention.
Figure 13E:
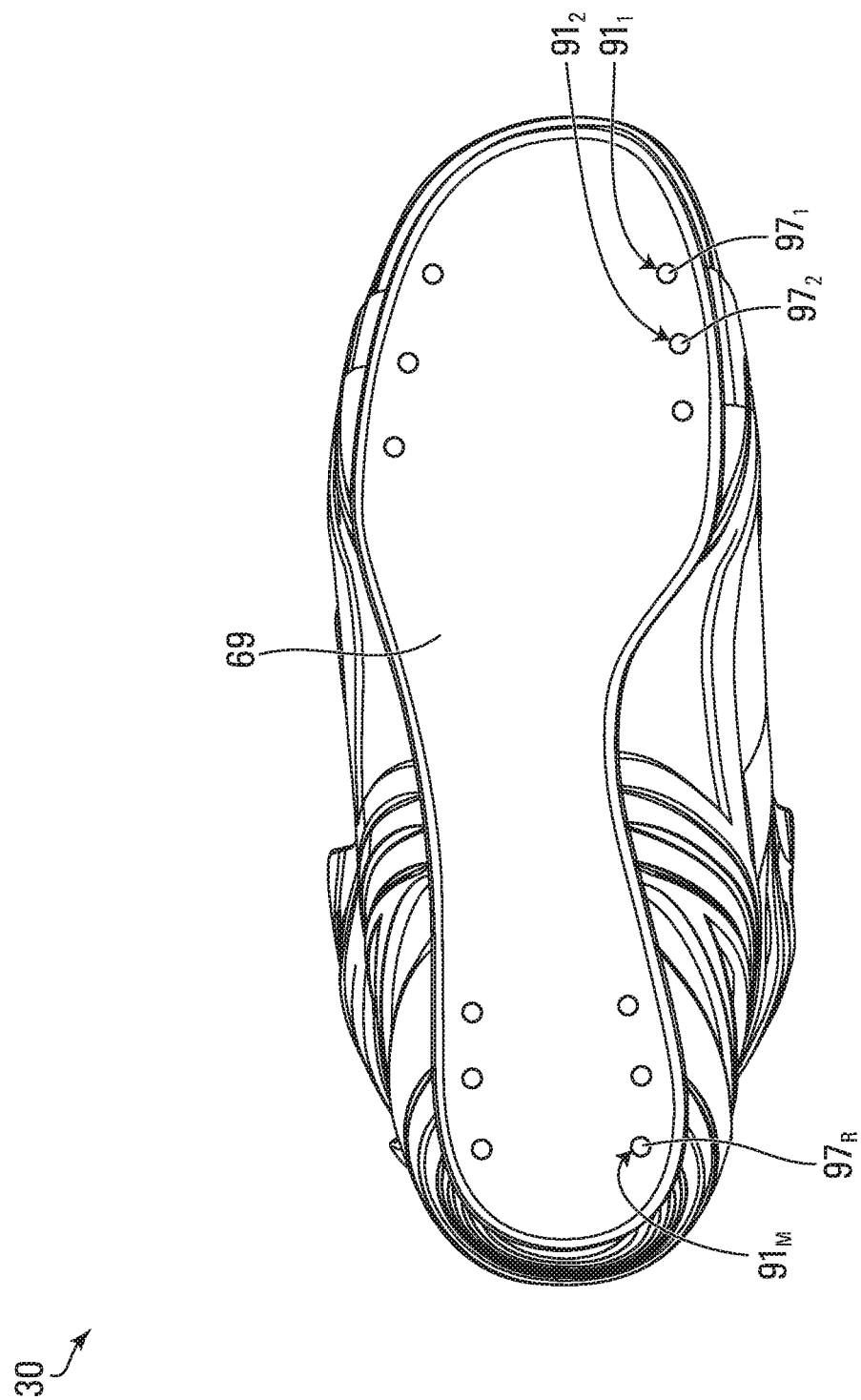

In other embodiments, with reference to FIG. 13E, the marks $91_1$-$91_M$ created while the monolithic body 30 is injection molded may include positional markers that respectively comprise openings $97_1$-$97_R$ that are preformed in the sole portion 69 of the monolithic body 30 for respectively aligning with respective openings $218_1$-$218_F$ of the skating device 28 to mount the skating device 28 to the sole portion 69. In other words, the openings $97_1$-$97_R$ of the monolithic body 30 may be formed in the monolithic body 30 while the monolithic body 30 is injection molded. To this end, the molding apparatus 150 and in particular the male mold element 152 and the female mold element 154 may be configured such that, while the monolithic body 30 is injection molded, the openings $97_1$-$97_R$ are formed. As shown in the embodiment in FIG. 7B, a male mold element 152' (which is a variant of the male mold element 152) may include a plurality of projections $158_1$-$158_I$ for abutting against the female mold element 154 while the monolithic body 30 is injection molded to form the openings $97_1$-$97_R$ to create the openings $97_1$-$97_R$. Fasteners such as rivets, screws, bolts, or any other suitable mechanical fastener may then be used to attach the skating device 28 to the sole portion 69 of the monolithic body 30, where respective ones of the fasteners pass through respective ones of the openings $218_1$-$218_F$ of the skating device 28 and through respective ones of the openings $97_1$-$97_R$ of sole portion 69 of the monolithic body 30. Preforming the openings $97_1$-$97_R$ may eliminate the need to drill the openings $97_1$-$97_R$ during the assembly process.

As another example, in this embodiment, the positional marker $91_4$ is disposed on the ankle portion 64 to position an ankle pad 33 of the skate boot 22 for providing comfort around the ankle A of the player's foot 11 and/or for providing a certain amount of heel lock. The ankle pad 33 may be affixed (e.g., by stitching, staples, an adhesive, etc.) to the monolithic body 30 and/or the liner 36.

The marks $91_1$-$91_M$ described herein are examples of positional markers and that other positional markers may be used to position any component of the skate boot 22 on the monolithic body 30.

With additional reference to FIG. 14, in some embodiments, the monolithic body 30 comprises ornamental elements $93_1$-$93_O$ created while the monolithic body 30 is injection molded. That is, the ornamental elements $93_1$-$93_O$ are molded ornamental elements integrally formed when molding the monolithic body 30.

In this embodiment, respective ones of the ornamental elements $93_1$-$93_O$ constitute textures of the monolithic body 30 that are different from one another. For instance, in this example, each of the ornamental elements $93_1$ and $93_4$ constitutes a first texture, the ornamental element $93_2$ constitutes a second texture, and the ornamental elements $93_3$ and $93_5$ respectively constitute a third texture and a fourth texture, whereby all these textures are different from one another. Examples of different textures may include one or more of a gloss texture, a semi-rough texture, a matte texture, raised texture, a dotted/bumped texture, a multi-square texture, a texture simulating a composite material (e.g., carbon fiber composite), and/or any other suitable texture. The texture of each of the ornamental elements $93_1$-$93_O$ is created while the monolithic body 30 is injection molded to have a desired appearance of that texture.

In this example, the texture of the ornamental element $93_2$ simulates a composite material. That is, an appearance of the texture of the ornamental element $93_2$ simulates an appearance of the composite material. For instance, in this case, the composite material simulated by the texture of the ornamental element $93_2$ is a fiber-matrix composite material comprising fibers disposed in a matrix. The matrix of the composite material simulated by the texture of the ornamental element $93_2$ may include any suitable substance. In this example, the matrix of the composite material simulated by the texture of the ornamental element $93_2$ is a polymeric matrix, such that the composite material simulated by the texture of the ornamental element $93_2$ is a fiber-reinforced plastic (FRP—a.k.a., fiber-reinforced polymer). The polymeric matrix may include any suitable polymeric resin, such as a thermoplastic or thermosetting resin, like epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin. The fibers of the composite material simulated by the texture of the ornamental element $93_2$ may be made of any suitable fibers, such as carbon fibers, glass fibers, polymeric fibers such as aramid fibers (e.g., Kevlar fibers), boron fibers, silicon carbide fibers, metallic fibers, ceramic fibers, etc. In this example, the fibers of the composite material simulated by the texture of the ornamental element $93_2$ are carbon fibers, such that the composite material simulated by the texture of the ornamental element $93_2$ is a carbon-fiber-reinforced plastic. In this embodiment, the fibers of the composite material simulated by the texture of the ornamental element $93_2$ are continuous such that they constitute a continuous fiber reinforcement of the composite material. For example, the fibers of the composite material simulated by the texture of the ornamental element $93_2$ may be provided as layers of continuous fibers (e.g. pre-preg (i.e., pre-impregnated) layers of fibers held together by an amount of matrix).

In this embodiment, the texture of the ornamental element $93_2$ is created while the monolithic body 30 is injection molded such that the ornamental element $93_2$ includes a plurality of parallel (e.g., oblique) lines and/or squares imitating a woven configuration of the carbon-fiber-reinforced plastic that it simulates.

Also, in this embodiment, the texture of the ornamental elements $93_1$ $93_4$ is a matte base texture with raised bumps. In this embodiment, the texture of the ornamental element $93_3$ is a high gloss texture. In this embodiment, the texture of the ornamental element $93_5$ is a semi-rough matte texture. Various other configurations of the textures are possible in other embodiments.

The molding apparatus 150, including the male mold element 152 and the female mold element 154, is configured such that the thickness T of the monolithic body 30 varies to achieve variations in stiffness of the monolithic body 30, the marks $91_1$-$91_M$, the ornamental elements $93_1$-$93_O$ and the like. For example, inside surfaces of the first and second portions 155 157 of the female mold element 154 may comprises one or more reduced and/or raised surfaces for creating the marks $91_1$-$91_M$ and/or the ornamental elements $93_1$-$93_O$ of the monolithic body 30.

In this embodiment, the skate boot 22 comprises graphical elements $95_1$-$95_G$ applied to the monolithic body 30.

More particularly, in this embodiment, the graphical elements $95_1$-$95_G$ are pad printed on to the monolithic body 30. Pad printing, which may also be known as tampography, is a process in which a 2-dimensional image is transferred onto a 3-dimensional object. For example, the graphical element $95_1$ is applied onto the mark $91_1$ as a pad print printed onto the mark $91_1$. The graphical element $95_1$ may include one or more colours and/or graphical designs applied onto the mark $91_1$.

In other embodiments, the graphical elements $95_1$-$95_G$ may be fused into the monolithic body 30. For example, the graphical element $95_1$ may be applied onto the mark $91_1$ as a print fused into the mark $91_1$. In these embodiments, the graphical element $95_1$ may include one or more colours and/or graphical designs fused into the mark $91_1$. An example of technology that may be used to fuse the graphical elements $95_1$-$95_G$ into the monolithic body 30 is that provided by Polyfuze Graphics™ Corporation, a Division of Mold In Graphic Systems®.

In other embodiments, other techniques may be used to apply the graphical elements $95_1$-$95_G$ onto the monolithic body 30, such as heat transfer, hot stamp foil, in-mold labels, other techniques that use inks, substrates and/or clear coats, and/or any other suitable technique.

In this embodiment, the liner 36 of the skate boot 22 is affixed to an inner surface 37 of the monolithic body 30 and comprises an inner surface 96 for facing the heel HL and medial and lateral sides MS, LS of the player's foot 11 and ankle A. The liner 36 may be affixed to the monolithic body 30 by stitching or stapling the liner 36 to the monolithic body 30, gluing with an adhesive and/or any other suitable technique. The inner lining 36 may be made of a soft material (e.g., a fabric made of NYLON® fibers, polyester fibers or any other suitable fabric). The footbed 38 may include a foam layer, which may be made of a polymeric material. For example, the footbed 38, in some embodiments, may include a foam-backed fabric. The footbed 38 is mounted inside the monolithic body 30 and comprises an upper surface 106 for receiving the plantar surface PS of the player's foot 11. In this embodiment, the footbed 38 affixed to the sole portion 69 of the monolithic body 30 by an adhesive and/or any other suitable technique. In other embodiments, the footbed 38 may be removable. In some embodiments, the footbed 38 may also comprise a wall projecting upwardly from the upper surface 106 to partially cup the heel HL and extend up to a medial line of the player's foot 11.

The lacing holes $45_1$-$45_L$ are configured to receive the lace 47. In this embodiment, the lacing holes $45_1$-$45_L$ extend through the monolithic body 30, the liner 36, and the medial and lateral facings $31_1$, $31_2$. Thus, in this case, each lacing hole $45_x$ comprises an opening $48_x$ in the monolithic body 30, an opening $49_x$ in the liner 36, and an opening $43_x$ in a given one of the medial and lateral facings $31_1$, $31_2$ that are aligned with one another to create the lacing hole $45_x$. In this embodiment, respective ones of the lacing holes $45_1$-$45_L$ are disposed in the medial side portion 66, the lateral side portion 68 and the ankle portion 64. In this embodiment, upper ones of the lacing holes $45_1$-$45_L$ extend through the upper part 302 of the monolithic body 30 and lower ones of the lacing holes $45_1$-$45_L$ extend through the lower part 304 of the monolithic body 30.

In this embodiment, the lacing holes $45_1$-$45_L$ are formed after the monolithic body 30 is injection molded. For example, the lacing holes $45_1$-$45_L$ may be created by punching and/or any other hole-forming technique for creating each opening $48_x$ of the monolithic body 30. For instance, in some embodiments, each lacing hole $45_x$ may be formed (e.g., punched) during an assembly process after the overlays $31_1$-$31_N$ and liner 36 are attached to the monolithic body 30, such that the opening $48_x$ in the monolithic body 30, the opening $49_x$ in the liner 36, and the opening $43_x$ in a given one of the medial and lateral facings $31_1$, $31_2$ of that lacing hole $45_x$ are formed (e.g., punched) simultaneously. Then, the eyelets $46_1$-$46_E$ may then be pushed through the lacing holes $45_1$-$45_L$.

In other embodiments, the openings $48_1$-$48_Y$ of the lacing holes $45_1$-$45_L$ may be preformed. In other words, the openings $48_1$-$48_Y$ of the monolithic body 30 may be formed in the monolithic body 30 while the monolithic body 30 is injection molded. To this end, the molding apparatus 150 and in particular the male mold element 152 and the female mold element 154 may be configured such that, while the monolithic body 30 is injection molded, the openings $48_1$-$48_Y$ to create the lacing holes $45_1$-$45_L$ are formed. As shown in the embodiment in FIG. 7B, the male mold element 152' may include a plurality of projections $159_1$-$159_J$ for abutting against the female mold element 154 while the monolithic body 30 is injection molded to form the openings $48_1$-$48_Y$ to create the lacing holes $45_1$-$45_L$. In such embodiment, the liner 36 may be formed with openings $49_1$-$49_Z$ and the medial and lateral facings $31_1$, $31_2$ may be formed with opening $43_1$-$43_W$. The liner 36 may then be affixed to the monolithic body 30 while aligning the opening $49_1$-$49_Z$ in the liner 36 with that of the openings $48_1$-$48_Y$ in the monolithic body 30. Similarly, the medial and lateral facings $31_1$, $31_2$ may then be affixed to the monolithic body 30 while aligning the opening $43_1$-$43_W$ in a given one of the medial and lateral facings $31_1$, $31_2$ with that of the openings $48_1$-$48_Y$ in the monolithic body 30.

Figure 15:
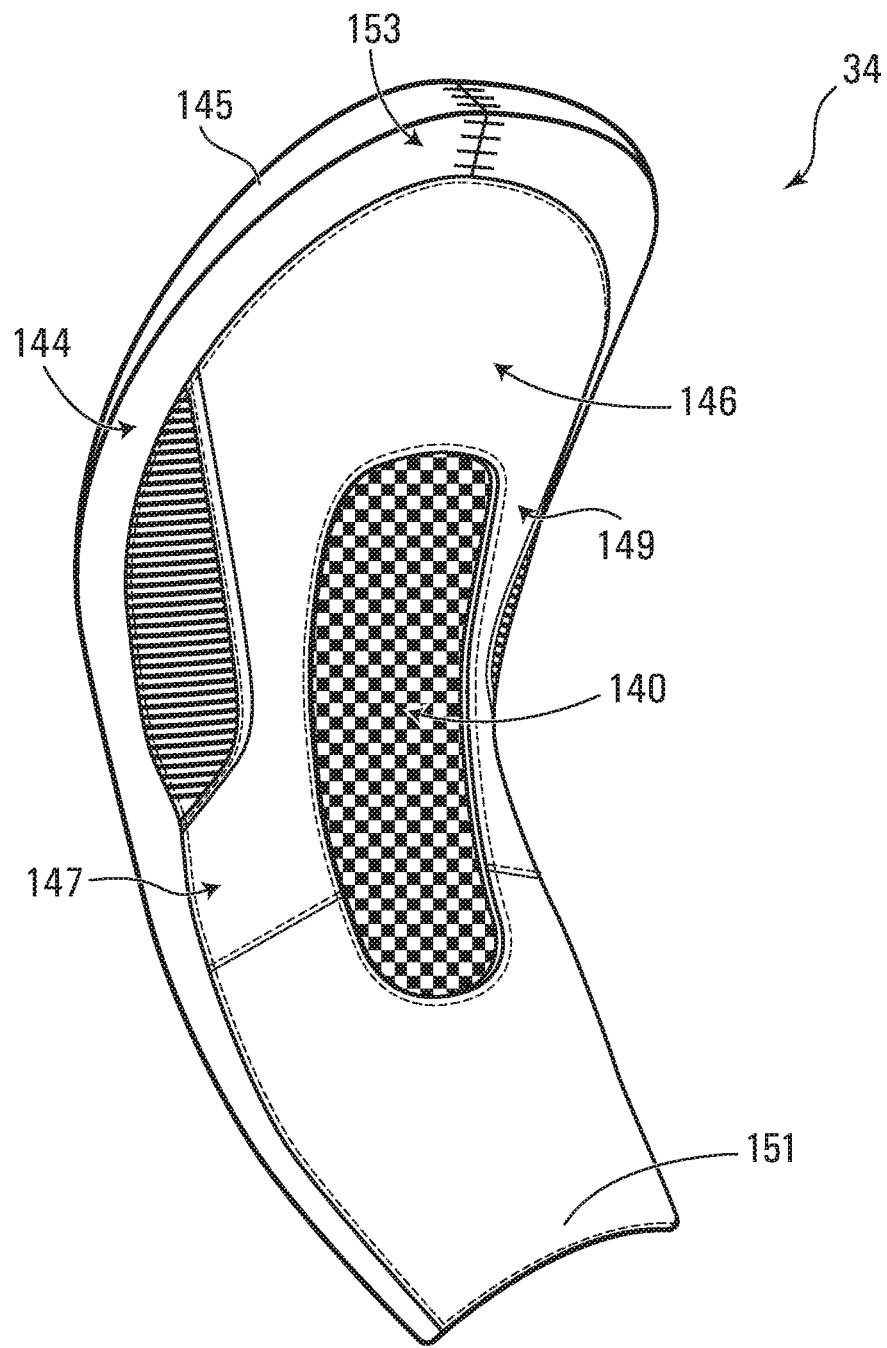
FIG. 15 is a perspective view of a tongue of the skate boot.

The tongue 34 extends upwardly and rearwardly from the toe portion 61 for overlapping the top surface TS of the player's foot 11. In this embodiment, the tongue 34 is affixed to the monolithic body 30. In particular, in this embodiment, the tongue 34 is fastened to the toe portion 61. With additional reference to FIG. 15, in some embodiments, the tongue 34 comprises a core 140 defining a section of the tongue 34 with increased rigidity, a padding member (not shown) for absorbing impacts to the tongue 34, a peripheral member 144 for at least partially defining a periphery 145 of the tongue 34, and a cover member 146 configured to at least partially define a front surface of the tongue 34. The tongue 34 defines a lateral portion 147 overlying a lateral portion of the player's foot 11 and a medial portion 149 overlying a medial portion of the player's foot 11. The tongue 34 also defines a distal end portion 151 for affixing to the toe portion 61 (e.g., via stitching or riveting) and a proximal end portion 153 that is nearest to the player's shin S. The core 140 may be made of foam or similar materials to that of the monolithic body 30 and may be formed by injection molding in a similar manner to that of the monolithic body 30, as described herein.

The skate boot 22 may be constructed in any other suitable way in other embodiments. For example, in other embodiments, various components of the skate boot 22 mentioned above may be configured differently or omitted and/or the skate boot 22 may comprise any other components that may be made of any other suitable materials and/or using any other suitable processes.

For example, in some embodiments, the body 30 of the skate boot 22 may not be monolithic, but may rather have two or more of the ankle portion 64, the heel portion 62, the medial side portion 66, the lateral side portion 68, the sole portion 69, the toe portion 61, and the tendon guard portion 63 formed separately and assembled together afterwards. For instance, in some embodiments, only the ankle portion 64, the heel portion 62, the medial side portion 66, and the lateral side portion 68 may be injection molded together as a single piece, while the sole portion 69, the toe portion 61, and the tendon guard portion 63 may be formed separately from that single piece and assembled with that single piece afterwards. In this embodiment, the tendon guard portion 63 extends upwardly from the rear portion 82 of the ankle portion 64 of the monolithic body 30 in order to protect the player's Achilles tendon AT.

As another example, in some embodiments, the tendon guard 63 may be a separate component from the monolithic body 30 such that the tendon guard 63 is fastened to the monolithic body 30, such as via a mechanical fastener (e.g., via stitching, stapling, a screw, etc.) or in any other suitable way. For instance, in other embodiments, the ankle portion 64, the heel portion 62, the medial side portion 66, the lateral side portion 68, the sole portion 69, and the toe portion 61 may be injection molded together and integral with one another and the tendon guard portion 63 is formed separately and attached to the monolithic body 30 after it has been molded.

Figure 16:
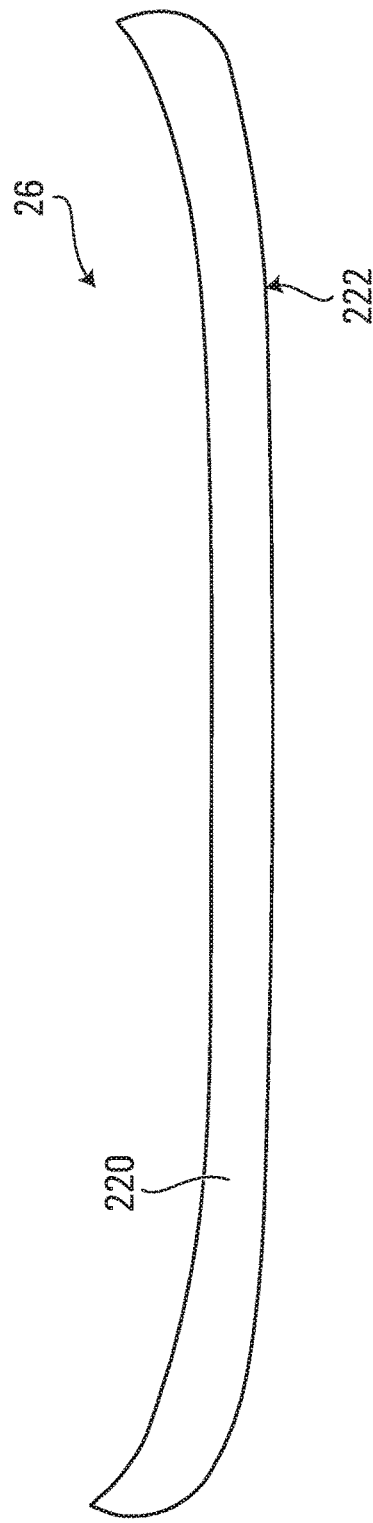
FIG. 16 is a side view of a blade of a skating device of the skate.

With additional reference to FIG. 16, the blade 26 comprises an ice-contacting material 220 including an ice-contacting surface 222 for sliding on the ice surface 14 while the player skates. In this embodiment, the ice-contacting material 220 is a metallic material (e.g., stainless steel). The ice-contacting material 220 may be any other suitable material in other embodiments.

The blade holder 24 comprises a lower portion 162 comprising a blade-retaining base 164 that retains the blade 26 and an upper portion 166 comprising a support 168 that extends upwardly from the blade-retaining base 164 towards the skate boot 22 to interconnect the blade holder 24 and the skate boot 22. A front portion 170 of the blade holder 24 and a rear portion 172 of the blade holder 24 define a longitudinal axis 174 of the blade holder 24. The front portion 170 of the blade holder 24 includes a frontmost point 176 of the blade holder 24 and extends beneath and along the player's forefoot in use, while the rear portion 172 of the blade holder 24 includes a rearmost point 178 of the blade holder 24 and extends beneath and along the player's hindfoot in use. An intermediate portion 180 of the blade holder 24 is between the front and rear portions 170, 172 of the blade holder 24 and extends beneath and along the player's midfoot in use. The blade holder 24 comprises a medial side 182 and a lateral side 184 that are opposite one another.

Figure 17:
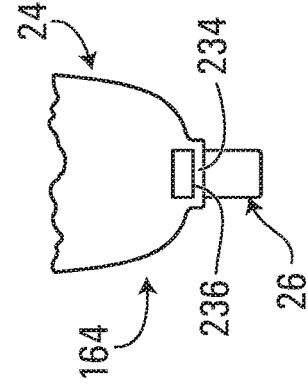
FIGS. 17 to 20 show different examples of embodiments in which the blade is affixed to a blade holder of the skating device of the skate.

The blade-retaining base 164 is elongated in the longitudinal direction of the blade holder 24 and is configured to retain the blade 26 such that the blade 26 extends along a bottom portion 186 of the blade-retaining base 164 to contact the ice surface 12. To that end, the blade-retaining base 164 comprises a blade-retention portion 188 to face and retain the blade 26. In this embodiment, as shown in FIG. 17, the blade-retention portion 188 comprises a recess 190 in which an upper portion of the blade 26 is disposed.

Figure 18:
Figure 19:
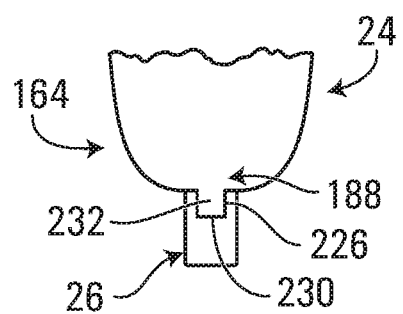
Figure 20:
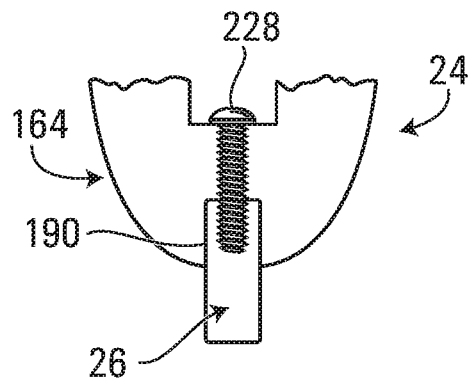

The blade holder 24 can retain the blade 26 in any suitable way. For instance, in this embodiment, the blade 26 may be permanently affixed to the blade holder 24 (i.e., not intended to be detached and removed from the blade holder 24). For example, as shown in FIG. 18, the blade 26 and the blade-retaining base 164 of the blade holder 24 may be mechanically interlocked via an interlocking portion 234 of one of the blade-retaining base 164 and the blade 26 that extends into an interlocking void 236 of the other one of the blade-retaining base 164 and the blade 26. For instance, in some cases, the blade 26 can be positioned in a mold used for molding the blade holder 24 such that, during molding, the interlocking portion 234 of the blade-retaining base 164 flows into the interlocking void 236 of the blade 26 (i.e., the blade holder 24 is overmolded onto the blade 26). In some embodiments, as shown in FIGS. 17, 19 and 20, the blade holder 24 may retain the blade 26 using an adhesive 226 and/or one or more fasteners 228. For instance, in some embodiments, as shown in FIG. 17, the recess 190 of the blade holder 24 may receive the upper portion of the blade 26 that is retained by the adhesive 226. The adhesive 226 may be an epoxy-based adhesive, a polyurethane-based adhesive, or any suitable adhesive. In some embodiments, instead of or in addition to using an adhesive, as shown in FIG. 20, the recess 190 of the blade holder 24 may receive the upper part of the blade 26 that is retained by the one or more fasteners 228. Each fastener 228 may be a rivet, a screw, a bolt, or any other suitable mechanical fastener. Alternatively or additionally, in some embodiments, as shown in FIG. 19, the blade-retention portion 188 of the blade holder 24 may extend into a recess 230 of the upper part of the blade 26 to retain the blade 26 using the adhesive 226 and/or the one or more fasteners 228. For instance, in some cases, the blade-retention portion 188 of the blade holder 24 may comprise a projection 232 extending into the recess 230 of the blade 26.

In this embodiment, the blade-retaining base 164 comprises a plurality of apertures $208_1$-$208_4$ distributed in the longitudinal direction of the blade holder 24 and extending from the medial side 182 to the lateral side 184 of the blade holder 24. In this example, respective ones of the apertures $208_1$-$208_4$ differ in size. The apertures $208_1$-$208_4$ may have any other suitable configuration, or may be omitted, in other embodiments.

The blade-retaining base 164 may be configured in any other suitable way in other embodiments.

The support 168 is configured for supporting the skate boot 22 above the blade-retaining base 164 and transmit forces to and from the blade-retaining base 164 during skating. In this embodiment, the support 168 comprises a front pillar 210 and a rear pillar 212 which extend upwardly from the blade-retaining base 164 towards the skate boot 22. The front pillar 210 extends towards the front portion 56 of the skate boot 22 and the rear pillar 212 extends towards the rear portion 58 of the skate boot 22. The blade-retaining base 164 extends from the front pillar 210 to the rear pillar 212. More particularly, in this embodiment, the blade-retaining base 164 comprises a bridge 214 interconnecting the front and rear pillars 210, 212.

The skate 10 may be implemented in any other suitable manner in other embodiments.

Figure 21:
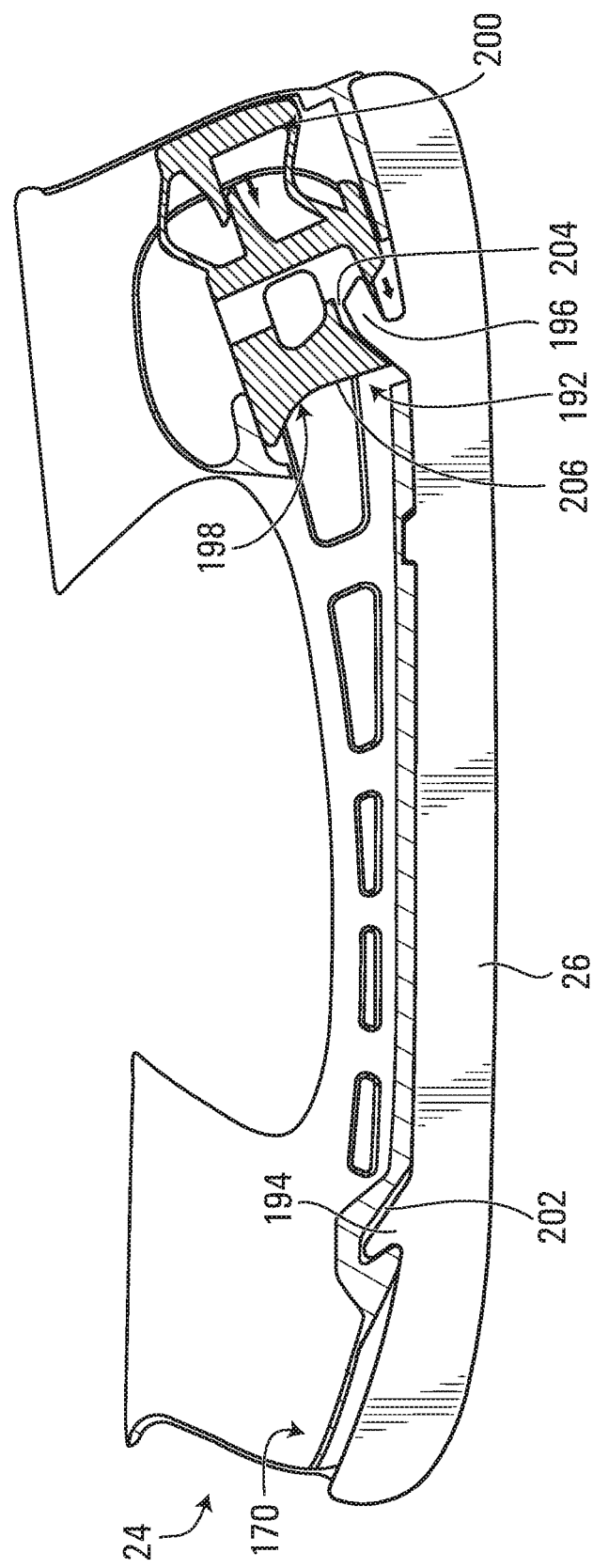
FIG. 21 is a cross-sectional view of the blade holder in an embodiment in which the blade holder comprises a blade-detachment mechanism.

For instance, in some embodiments, the blade holder 24 may retain the blade 26 in any other suitable way. For example, in other embodiments, as shown in FIG. 21, the blade holder 24 comprises a blade-detachment mechanism 192 such that the blade 26 is selectively detachable and removable from, and attachable to, the blade holder 24 (e.g., when the blade 26 is worn out or otherwise needs to be replaced or removed from the blade holder 24).

More particularly, in this embodiment, the blade 26 includes a plurality of projections 194, 196. The blade-detachment mechanism 192 includes an actuator 198 and a biasing element 200 which biases the actuator 198 in a direction towards the front portion 170 of the blade holder 24. In this embodiment, the actuator 198 comprises a trigger. To attach the blade 26 to the blade holder 24, the front projection 194 is first positioned within a hollow space 202 (e.g., a recess or hole) of the blade holder 24. The rear projection 196 can then be pushed upwardly into a hollow space 204 (e.g., a recess or hole) of the blade holder 24, thereby causing the biasing element 200 to bend and the actuator 198 to move in a rearward direction. In this embodiment, the rear projection 196 will eventually reach a position which will allow the biasing element 200 to force the actuator 198 towards the front portion 170 of the blade holder 24, thereby locking the blade 26 in place. The blade 26 can then be removed by pushing against a finger-actuating surface 206 of the actuator 198 to release the rear projection 196 from the hollow space 204 of the blade holder 24. Thus, in this embodiment, the blade-detachment mechanism 192 is free of any threaded fastener (e.g., a screw or bolt) to be manipulated to detach and remove the blade 26 from the blade holder 24 or to attach the blade 26 to the blade holder 24.

Further information on examples of implementation of the blade-detachment mechanism 192 in some embodiments may be obtained from U.S. Pat. No. 8,454,030 hereby incorporated by reference herein. The blade-detachment mechanism 192 may be configured in any other suitable way in other embodiments.

Figure 22:
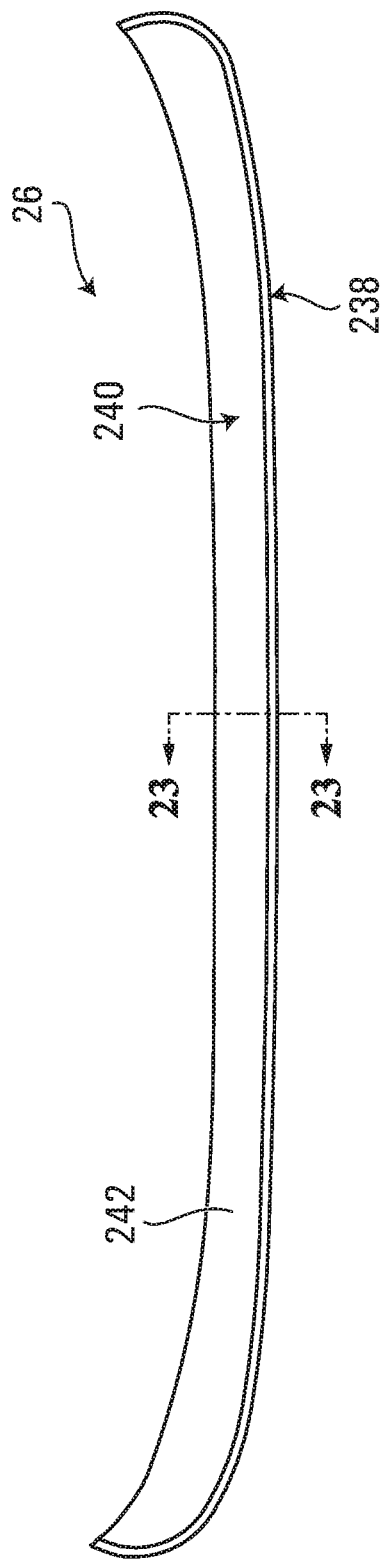
FIG. 22 is a side view of the blade of the skating device.
Figure 23:
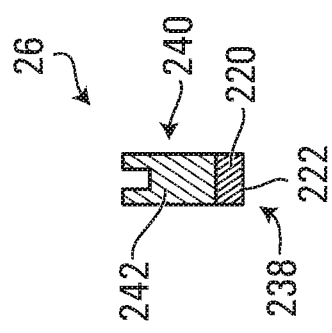
FIG. 23 is a cross-sectional view of the blade taken along line 23-23 of FIG. 22.
Figure 24:
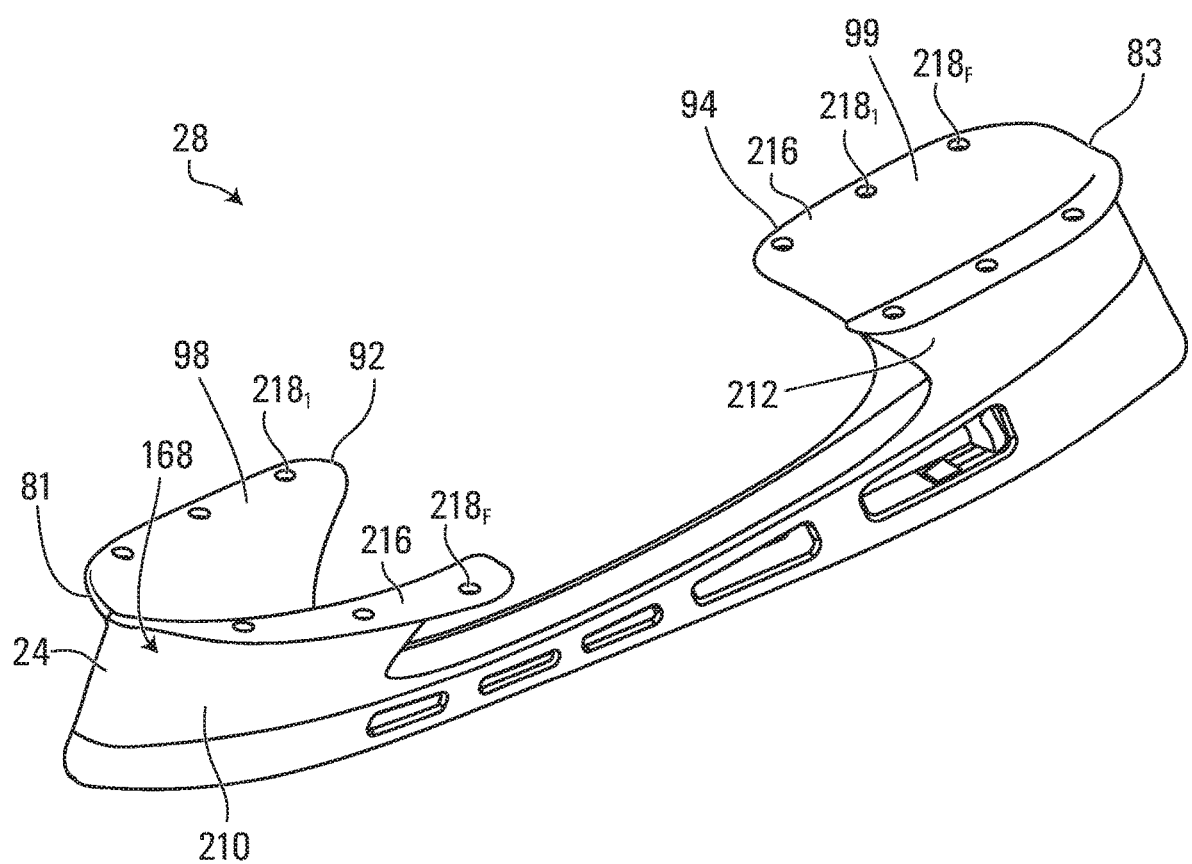
FIG. 24 is a perspective view of the blade holder.

The blade 26 may be implemented in any other suitable way in other embodiments. For example, in some embodiments, as shown in FIGS. 22 and 23, the blade 26 may comprise a lower member 238 that is made of the ice-contacting material 220 and includes the ice-contacting surface 222 and an upper member 240 connected to the lower member 238 and made of a material 242 different from the ice-contacting material 220. The lower member 238 and the upper member 240 of the blade 26 may be retained together in any suitable way. For example, in some cases, the lower member 238 may be adhesively bonded to the upper member 240 using an adhesive. As another example, in addition to or instead of being adhesively bonded, the lower member 238 and the upper member 240 may be fastened using one or more fasteners (e.g., rivets, screws, bolts, etc.). As yet another example, the lower member 238 and the upper member 240 may be mechanically interlocked by an interlocking portion of one of the lower member 238 and the upper member 240 that extends into an interlocking space (e.g., one or more holes, one or more recesses, and/or one or more other hollow areas) of the other one of the lower member 238 and the upper member 240 (e.g., the upper member 240 may be overmolded onto the lower member 238).

Although in embodiments considered above the skate 10 is designed for playing ice hockey on the skating surface 12 which is ice 14, in other embodiments, the skate 10 may be constructed using principles described herein for playing roller hockey or another type of hockey (e.g., field or street hockey) on the skating surface 12 which is a dry surface (e.g., a polymeric, concrete, wooden, or turf playing surface or any other dry surface on which roller hockey or field or street hockey is played). Thus, in other embodiments, instead of comprising the blade 26, the skating device 28 may comprise a set of wheels to roll on the dry skating surface 12 (i.e., the skate 10 may be an inline skate or other roller skate).

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

To facilitate the description, any reference numeral designating an element in one figure designates the same element if used in any other figures. In describing the embodiments, specific terminology has been resorted to for the sake of description but the invention is not intended to be limited to the specific terms so selected, and it is understood that each specific term comprises all equivalents.

In case of any discrepancy, inconsistency, or other difference between terms used herein and terms used in any document incorporated by reference herein, meanings of the terms used herein are to prevail and be used.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A skate boot for a skate, the skate comprising a skating device disposed beneath the skate boot to engage a skating surface, the skate boot defining a cavity to receive a foot of a user, the skate boot comprising:
   a. a monolithic body comprising an ankle portion to receive an ankle of the user, a heel portion to receive a heel of the user's foot, a medial side portion to face a medial side of the user's foot, and a lateral side portion to face a lateral side of the user's foot, the monolithic body being injection molded such that the ankle portion, the heel portion, the medial side portion and the lateral side portion are injection molded together and integral with one another; and b. a texture integrally formed with the monolithic body and simulating an appearance of a composite material.

2. The skate boot of claim 1, wherein the composite material a fiber-reinforced polymeric material.

3. The skate boot of claim 1, wherein the fiber-reinforced polymeric material is a carbon-fiber-reinforced plastic.

4. The skate boot of claim 1, wherein the texture is part of an external surface of the skate boot.

5. The skate boot of claim 1, wherein the texture is molded during molding of at least part of the monolithic body.

6. A skate comprising:
a. a skate boot defining a cavity to receive a foot of a user, the skate boot comprising:
   a monolithic body comprising an ankle portion to receive an ankle of the user, a heel portion to receive a heel of the user's foot, a medial side portion to face a medial side of the user's foot, a lateral side portion to face a lateral side of the user's foot, and a sole portion to face a plantar surface of the user's foot, the monolithic body being injection molded such that the ankle portion, the heel portion, the medial side portion, the lateral side portion, and the sole portion are injection molded together and integral with one another, a thickness of the monolithic body varying, the thickness of an upper part of the monolithic body being greater than the thickness of a lower part of the monolithic body; and
   lacing holes to receive a lace and extending through the monolithic body; and
b. a skating device disposed beneath the skate boot to engage a skating surface;
wherein at least part of the upper part of the monolithic body is part of at least one of the ankle portion, the heel portion, the medial side and the lateral side portion, and at least part of the lower part of the monolithic body is part of at least one of the ankle portion, the heel portion, the medial side and the lateral side portion.

7. The skate of claim 6, wherein upper ones of the lacing holes extend through the upper part of the monolithic body and lower ones of the lacing holes extend through the lower part of the monolithic body.

8. The skate of claim 6, wherein the upper part of the monolithic body includes a part of the ankle portion and the lower part of the monolithic body includes respective parts of the medial side portion and the lateral side portion.

9. The skate of claim 6, wherein the upper part of the monolithic body is stiffer than the lower part of the monolithic body to facilitate forward flex of the user's ankle by opposing overtightening of the ankle portion about the user's ankle and to facilitate tightening of the medial side portion and the lateral side portion about an instep of the user's foot.

10. The skate of claim 6, wherein the skate boot comprises a toe portion to enclose toes of the user's foot, the toe portion being separate from the monolithic body and assembled to the monolithic body.

11. The skate of claim 6, wherein the skate is an ice skate and the skating device comprises a blade holder and a blade.

12. A skate comprising:
a. a skate boot defining a cavity to receive a foot of a user, the skate boot comprising:
   a monolithic body comprising an ankle portion to receive an ankle of the user, a heel portion to receive a heel of the user's foot, a medial side portion to face a medial side of the user's foot, a lateral side portion to face a lateral side of the user's foot, and a sole portion to face a plantar surface of the user's foot, the monolithic body being injection molded such that the ankle portion, the heel portion, the medial side portion, the lateral side portion, and the sole portion are injection molded together and integral with one another, the monolithic body comprising an outer surface and an inner surface defining a thickness of the monolithic body, the outer surface of at least one of: the ankle portion; the heel portion; the medial side portion; and the lateral side portion of the monolithic body comprising a plurality of projections such that the thickness of the monolithic body at a given one of the plurality of projections is greater than at another part of the monolithic body; and
   lacing holes to receive a lace and extending through the monolithic body; and
b. a skating device disposed beneath the skate boot to engage a skating surface.

13. The skate of claim 12, wherein upper ones of the lacing holes extend through an upper part of the monolithic body and lower ones of the lacing holes extend through a lower part of the monolithic body.

14. The skate of claim 12, wherein an upper part of the monolithic body includes a part of the ankle portion and a lower part of the monolithic body includes respective parts of the medial side portion and the lateral side portion.

15. The skate of claim 12, wherein an upper part of the monolithic body is stiffer than a lower part of the monolithic body to facilitate forward flex of the user's ankle by opposing overtightening of the ankle portion about the user's ankle and to facilitate tightening of the medial side portion and the lateral side portion about an instep of the user's foot.

16. The skate of claim 12, wherein the skate boot comprises a toe portion to enclose toes of the user's foot, the toe portion being separate from the monolithic body and assembled to the monolithic body.

17. The skate of claim 12, wherein the monolithic body comprises a mark created while the monolithic body is injection molded.

18. The skate of claim 17, wherein the mark is a logo.

19. The skate of claim 17, wherein the mark is a positional marker to position a component of the skate on the monolithic body.

20. The skate of claim 17, wherein the skate boot comprises a graphical element applied onto the mark.

21. The skate of claim 17, where the mark comprises the plurality of projections of the monolithic body.

22. The skate of claim 17, where the mark comprises a recess.

23. The skate of claim 12, wherein the skate is an ice skate and the skating device comprises a blade holder and a blade.

* * * * *